US012641693B2

(12) United States Patent
Skekloff et al.

(10) Patent No.: US 12,641,693 B2
(45) Date of Patent: May 26, 2026

(54) MACHINE VISION SYSTEMS, ILLUMINATION SOURCES FOR USE IN MACHINE VISION SYSTEMS, AND COMPONENTS FOR USE IN THE ILLUMINATION SOURCES

(71) Applicants: Jon Skekloff, Holland, MI (US); Steven Kinney, Hart, MI (US); Ryan Orzechowski, Belding, MI (US)

(72) Inventors: Jon Skekloff, Holland, MI (US); Steven Kinney, Hart, MI (US); Ryan Orzechowski, Belding, MI (US)

(73) Assignee: Smart Vision Lights, LLC, Norton Shores, MI (US)

( * ) Notice: Subject to any disclaimer, the term of this patent is extended or adjusted under 35 U.S.C. 154(b) by 0 days.

(21) Appl. No.: 18/603,665

(22) Filed: Mar. 13, 2024

(65) Prior Publication Data

US 2024/0314905 A1 Sep. 19, 2024

Related U.S. Application Data

(60) Provisional application No. 63/452,666, filed on Mar. 16, 2023.

(51) Int. Cl.

| | |
|---|---|
| ***H04N 23/56*** | (2023.01) |
| ***H05B 45/14*** | (2020.01) |
| ***H05B 45/325*** | (2020.01) |
| ***H05B 45/375*** | (2020.01) |

(52) U.S. Cl.

CPC .......... *H05B 45/325* (2020.01); *H05B 45/14* (2020.01); *H05B 45/375* (2020.01)

(58) Field of Classification Search

CPC .... H05B 45/14; H05B 45/325; H05B 45/375; H05B 47/00; H05B 47/10; H05B 47/125; H04N 23/56; H04N 5/2625; H04N 7/188; H04N 9/3123

See application file for complete search history.

(56) References Cited

U.S. PATENT DOCUMENTS

| | | | | |
|---|---|---|---|---|
| 6,040,895 A * | 3/2000 | Haas | H05K 13/0812 | 356/399 |
| 8,058,815 B1 * | 11/2011 | Hardy | H05B 45/345 | 315/307 |
| 2006/0245623 A1 * | 11/2006 | Loiacono | A61B 5/1171 | 382/117 |
| 2007/0053677 A1 * | 3/2007 | Steenburgh | G03B 15/05 | 396/155 |
| 2020/0134773 A1 * | 4/2020 | Pinter | G01N 21/8806 | |
| 2020/0205325 A1 * | 6/2020 | Jonasson | H05K 13/0812 | |
| 2021/0299879 A1 * | 9/2021 | Pinter | B25J 9/1697 | |

* cited by examiner

*Primary Examiner* — Thai Pham

(74) *Attorney, Agent, or Firm* — Atwater Law & Intellectual Property, PLLC; David Stuart Atwater

(57) ABSTRACT

The present disclosure generally relates to machine vision systems, illumination sources for use in machine vision systems, and components for use in the illumination sources. More specifically, the present disclosure relates to machine vision systems incorporating multi-function illumination sources, multi-function illumination sources, components for use in multi-function illumination sources, machine vision systems incorporating hidden strobe technology, and light emitting diode strobe power management.

2 Claims, 19 Drawing Sheets

MACHINE VISION SYSTEMS, ILLUMINATION SOURCES FOR USE IN MACHINE VISION SYSTEMS, AND COMPONENTS FOR USE IN THE ILLUMINATION SOURCES

CROSS REFERENCE TO RELATED APPLICATIONS

The present application claims the benefit of provisional application number Ser. No. 63/452,666, filed Mar. 16, 2023. The present application is related to U.S. provisional patent application Ser. No. 62/751,561, filed Oct. 27, 2018, U.S. patent application Ser. No. 16/664,806, filed Oct. 26, 2019 (now U.S. Pat. No. 11,328,380, patented Apr. 20, 2022), and U.S. patent application Ser. No. 17/334,752, filed May 30, 2021. The entire disclosures of the aforementioned applications are incorporated herein by reference.

TECHNICAL FIELD

The present disclosure generally relates to machine vision systems, illumination sources for use in machine vision systems, and components for use in the illumination sources. More specifically, the present disclosure relates to machine vision systems incorporating multi-function illumination sources, multi-function illumination sources, components for use in multi-function illumination sources, machine vision systems incorporating hidden strobe technology, and light emitting diode strobe power management.

BACKGROUND

Machine vision systems rely on digital images (e.g., one-dimensional, two-dimensional, etc.) of objects (e.g., a chrome plated surface of an object, a highly reflective surface of an object, a bar code, a QR code, a printed circuit board, etc.) for generating information (e.g., bar code information, QR code information, product defect detection, product quality, product acceptability, etc.) related to the object at hand.

High quality images (e.g., a two-dimensional grayscale representation of an object, a digital image with a signal-to-noise ratio above a threshold, etc.) enable machine vision systems to accurately interpret information extracted from an image of an object under inspection, resulting in reliable, repeatable system performance. The quality of the image acquired in any machine vision application is highly dependent on an associated lighting configuration: the color, angle, pattern, amount of light used to illuminate an object, etc., can mean the difference between a digital image having a signal-to-noise ratio above or below an associated signal-to-noise ratio, resulting in good performance, and a poor image, yielding poor results.

Often, a machine vision system may incorporate a plurality of cameras and/or a plurality of light sources. Because machine vision strobe light pulses can be irritating to humans, there is a need for a product where the individual light sources, which start in a steady state pulse, may be temporarily strobed on and off in coordination with a respective camera acquiring an image of an object or a surface of an object. The light sources then resume their steady state pulses, minimizing or eliminating irritation to humans.

SUMMARY

In a first preferred example of the invention, an illumination source, having a controller configured to receive a specified pulse width and a defined cycle time, generates a stream of strobe output pulses based on the specified pulse width and defined cycle time. The controller is also configured to receive a strobe stop trigger and stop the stream of strobe output pulses based on the strobe stop trigger. The controller is further configured to receive a strobe start trigger and start the stream of strobe output pulses based on the strobe start trigger. The controller is further configured to generate a camera trigger based on the strobe start trigger.

In another example of the invention, an illumination device may include an integrated driver and one trigger event to interrupt a free-running pulse rate to follow a camera trigger for light output. A processor may measure a camera trigger on pulse time and calculate a lockout period based on the duty cycle of free-running pulses. The processor may then restart free-running light pulses having an average energy of the light output.

In another example of the invention, a machine vision system includes a power management circuit having energy storage, a soft start circuit, and a voltage regulator with current limit. The power management circuit limits an input current based on the soft start circuit and the voltage regulator current limit.

In another example of the invention, a machine vision system includes a light emitting diode drive circuit with energy storage and a controller configured to charge the energy storage during a strobe turn off period and to discharge the energy storage during a strobe turn on period.

In a further example of the invention, a machine vision system includes coaxial patterned illumination.

DETAIL DESCRIPTION

An illumination source may be configured to generate a pulse of light pulse following a reduction in light intensity. The light pulse is provided with an intensity above a high intensity threshold and below a thermal threshold. The light pulse may be less detectable by a human eye compared to a pulse of light following a steady state light output.

An illumination source may include power management. The power management may include energy storage configured to limit an input power to the illumination source and provide pulses of light with energy above a high intensity threshold.

An illumination source may include a LED drive circuit with high duty cycle efficiency and fast response time. An illumination source may include coaxial patterned illumination.

A machine vision system may include a computer-based characterization of a digital image from an electronic sensor (e.g., a light sensor, a camera, a sonar sensor, an ultra-sonic sensor, etc.). A digital image may be one dimensional (1D) (e.g., a row of light sensors etc.) or two dimensional (2D) (e.g., an array of light sensors etc.). Pixels may include an (X,Y) location and an intensity value (e.g., 0-255 gray scales, or 8-bit contrast). Contrast may represent a visible intensity difference between dark (e.g., near 0) and light (e.g., near 255) pixels. In a derivative form, light contrast patterns from an object may be characterized by a machine vision system.

Some considerations when choosing lighting for use in machine vision systems may include: (1) is the surface flat, slightly bumpy or very bumpy?; (2) is the surface matte or shiny?; (3) is the object curved or flat?; (4) what is the color of the barcode or mark?; and (5) are moving parts or stationary objects being inspected? Choosing lighting for a machine vision system is one aspect to success of the machine vision system and may be a consideration when setting up the machine vision system. A well-planned lighting solution may result in better machine vision system performance and may save time, effort, and money in the long run. Lighting options may, for example, include: (1) use of bright light to detect missing material; (2) use of appropriate wavelength of light for accurate component placement; (3) use of non-diffused light to detect cracks in glass; (4) use of diffused light to inspect transparent packaging; (5) use of color to create contrast; (6) use of strobed light for rapidly moving parts; (7) use of infrared light to eliminate reflections; and (8) use of infrared light to diminish color variation.

Figure 1:
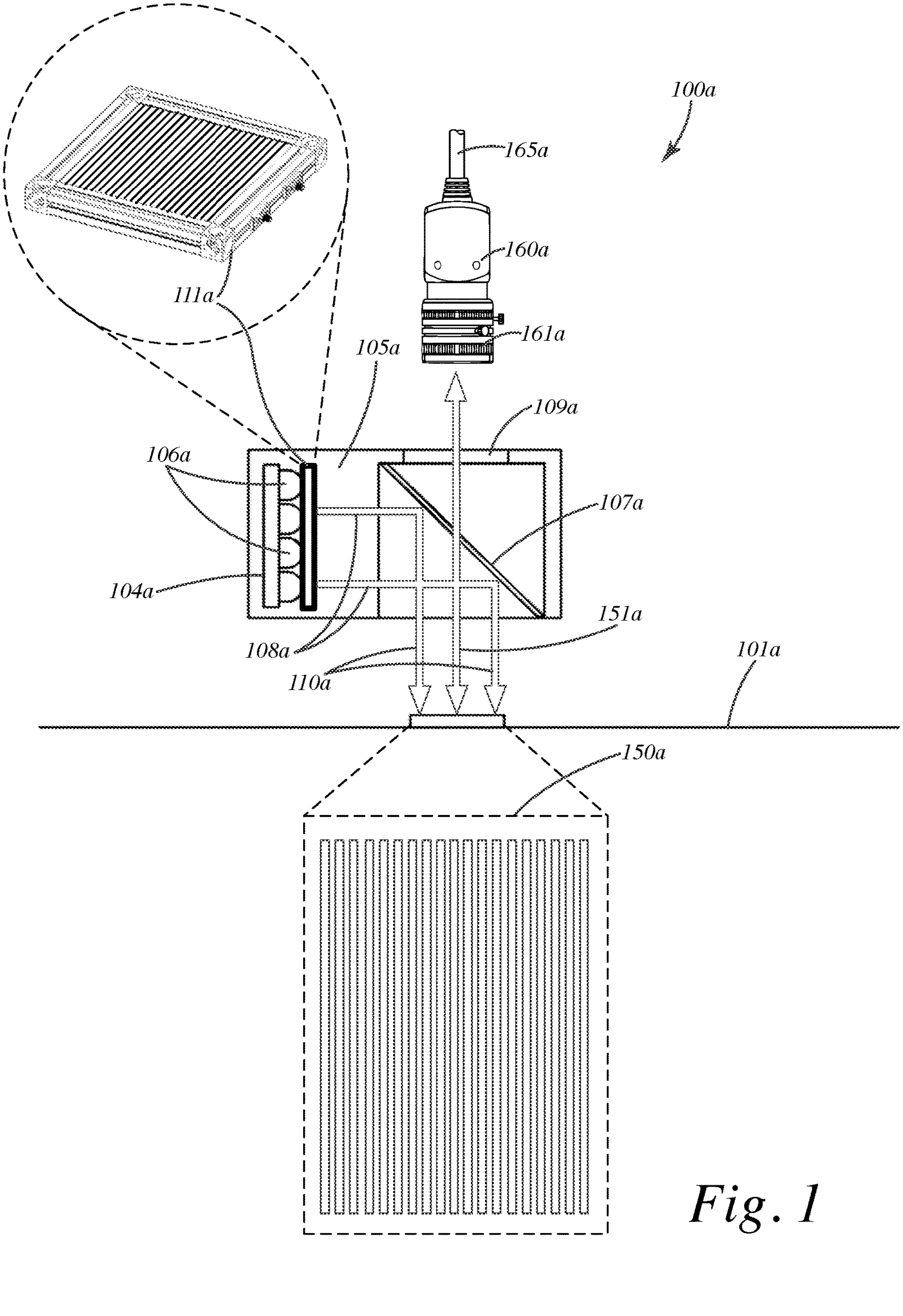
FIGS. 1 and 2 depict an example machine vision system incorporating a coaxial patterned illumination source.
Figure 2:
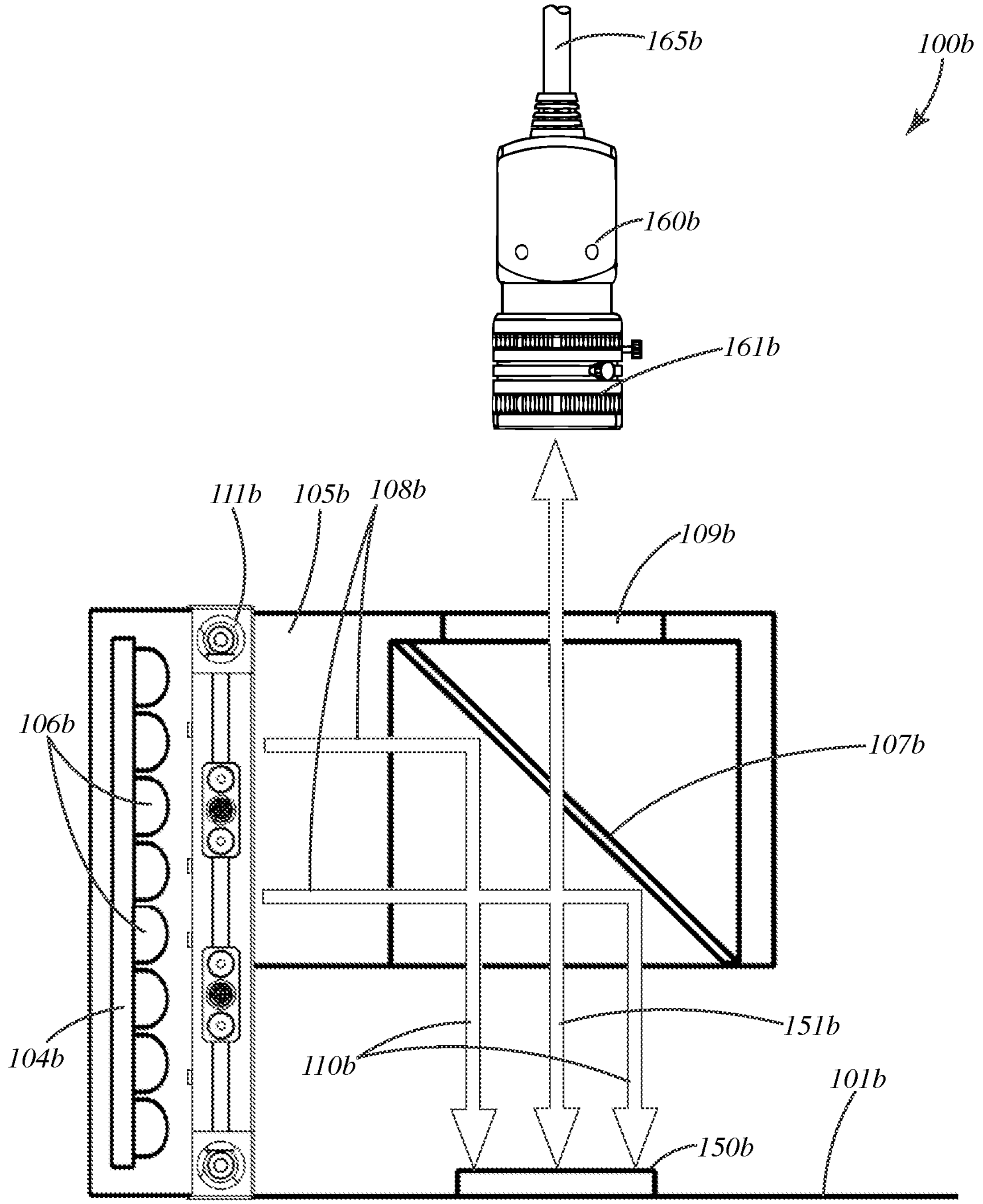

In one example, a coaxial patterned illumination source 105*a* or 105*b* (e.g., coaxial patterned illumination light/wavelength with camera 160*a* or 160*b*, as depicted in FIGS. 1 and 2) may be used to detect missing material (e.g., identifying defects in high gloss surfaces).

A bright field lighting technique may rely on surface texture and flat topography. Light rays hitting a flat specular surface may reflect light strongly back to the camera, creating a bright area. Roughly textured or missing surfaces may scatter the light away from an associated camera, creating dark areas. When material is absent during a molding operation (i.e., a short shot), presenting a failure in, for example, a bottle sealing surface, a coaxial light source may reflect brightly off a sealing surface of a good bottle. This may present the camera with a well-defined bright annular area.

In another example, a particular wavelength of light may be used to, for example, detect accurate component placement (e.g., inspecting flipped chips on an electronic printed circuit board). Identifying proper component orientation is a common machine vision application in printed circuit board assembly. In this example, chips may be incorrectly flipped in an automated assembly step. For example, instead of being placed onto a substrate (e.g., printed circuit board) with copper side down for proper electrical connection, a chip may be flipped over, silver side down, causing component and assembly failure. A machine vision system having a light source that emits a particular color may reflect brightly off properly installed components, while improperly installed components may absorb the light and appear to a camera as dark. The sharp difference in contrast may be recognized by an associated machine vision system, enabling real-time process corrections.

A useful method for creating a high contrast image in a machine vision application is to illuminate an object with light of a particular wavelength (color). A light's wavelength can make features with color appear either bright or dark to, for example, a monochrome camera. Using a color wheel as a reference, a light of an opposing color (i.e., wavelength) may be chosen to make features dark (i.e., a light source of the same color as the object may make associated features of the object light). For example: if the feature that is desired to make darker is red, a green light may be used. A green light may be used to make a green feature appear lighter. Differences in red and blue lighting on printed aluminum may be useful.

An infrared light may be used to eliminate reflections (e.g., inspecting shiny objects such as chrome parts). Machine vision systems may rely on transitions of gray levels in a digital image. In many machine vision applications, ambient light sources (i.e., overhead room lighting) may contribute unwanted bright reflections that make it difficult or impossible for the vision system to detect the features of interest. An infrared light source can be used to eliminate this problem. Use of infrared light to diminish color variation of objects (e.g., inspecting an array of different color crayons) may be used to diminish a grayscale difference between the colored objects. For example, dark objects may absorb infrared light waves, creating uniformity in objects of otherwise varying shades. This lighting solution may facilitate detection of inconsistencies where color or shade variation is expected and this lighting solution should not degrade inspection.

In a further example, a non-diffused light emitter may be incorporated within a machine vision system to detect cracks in glass. A patterned light source oriented at a 90° angle with respect to camera angle may be used, for example, to detect defects in a chrome surface. Such detection, prior to packaged-goods shipment, is one way to decrease waste, decrease returns, and increase consumer confidence. The illumination source may highlight any imperfections.

With reference to FIGS. 1 and 2, a machine vision system 100*a* or 100*b* may incorporate a coaxial patterned illumination source 105*a* or 105*b* that may be configured to illuminate a target 150*a* or 150*b* via photons 108*a* or 108*b* emitted by light source(s) 106*a*, 106*b*, 111*a*, or 111*b* toward the target 150*a* or 150*b*, for example, traveling on a target transport 101*a* or 101*b* (e.g., a conveyer belt, a robot, etc.). The coaxial patterned illumination source 105*a* or 105*b* may include an illumination source optical element 107*a* or 107*b* (e.g., a half-mirror, a beam splitter, a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 1 or 2, the illumination source optical element 107*a* or 107*b* may be manually and/or automatically variable. While similarly not shown in FIG. 1 or 2, a coaxial patterned illumination source 105*a* or 105*b* may include a hardwired electrical power/control connection or a hardwired electrical power connection and a wireless control (e.g., WIFI, Bluetooth, radio frequency, a wide area wireless network, etc.).

The machine vision system 100*a* or 100*b* may incorporate camera 160*a* or 160*b* having an electrical power/control connection 165*a* or 165*b* and/or a camera optical element 161*a* or 161*b* (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). While not shown in FIG. 1 or 2, the camera optical element 161*a* or 161*b* may be manually and/or automatically variable via, for example, control signals received via the electrical power/control connection 165*a* or 165*b*. As an alternative, or addition, the camera 160*a* or 160*b* may include a wireless control (e.g., WIFI, Bluetooth, radio frequency, a wide area wireless network, etc.). The coaxial patterned illumination source 105*a* or 105*b* may include an electrical printed circuit 104*a* or 104*b* that may control the light source(s) 106*a*, 106*b*, 111*a*, or 111*b*, the illumination source optical element 107*a* or 107*b*, the camera 160*a* or 160*b*, and/or the camera optical element 161*a* or 161*b*.

In any event, the photons 108*a* or 108*b* may be redirected by the illumination source optical element 107*a* or 107*b* such that photons 110*a* or 110*b* may impact the target 150*a* or 150*b* and may result in regular reflections 151*a* or 151*b* passing through an illumination source aperture 109*a* or 109*b*. The regular reflections 151*a* or 151*b* may be dependent upon, for example, any target defects. The camera 160*a* or 160*b* may detect, for example, the regular reflections 151*a* or 151*b*. The machine vision system 100*a* or 100*b* may detect target defects by, for example, distinguishing regular reflections 151*a* or 151*b* associated with a target defect from regular reflections 151*a* or 151*b* associated with a target that does not include a defect.

A coaxial patterned illumination source 105*a* or 105*b* may, for example, apply light on axis with the camera optical element 161*a* or 161*b*. Contrast between dark and bright parts of a target 150*a* or 150*b* may be captured and differentiated by allowing the regular reflections 151*a* a or 151*b* from, for example, a glossy surface of the target 150*a* or 150*b* into the camera 160*a* or 160*b* while, for example, blocking diffuse light at any edges of a defect. Thereby, the coaxial patterned illumination source 105*a* or 105*b* may enhance, for example, an edge of an imprinting against a reflective surface (i.e., the machine vision system 100*a* or 100*b* may detect imprints on press-molded parts).

In a specific example, product numbers and/or specification imprints may be recognized by associated patterns. Incorrect stamping and mixing of different products may also be detected. With direct reflection, an engraved mark may not be stably detected due to irregular reflection. With the coaxial patterned illumination source 105*a* or 105*b*, on the other hand, an engraved mark, for example, on a target may appear dark so that a stable detection can be conducted. The coaxial patterned illumination source 105*a* or 105*b* may be used in conjunction with inspection of a glass target. With direct reflection, because a sticker may reflect the illumination, edges of a defective sticker may not be clear (i.e., only the edges may be extracted). With the coaxial patterned illumination source 105*a* or 105*b*, on the other hand, position detection of stickers may be precisely carried out.

In the method of deflectometry, using the coaxial illuminator, the pattern is not projected but is imaged through the reflective. The difference in use-case between the two methods has to do with the surface finish of the object to be imaged. For specularly reflective surfaces, deflectometry may be used. For diffuse surfaces, profilometry may be used.

Deflectometry mode includes a light absorbing pattern that can be placed over the light emitting surface; any pattern type including binary, or gradients can be used. The pattern is imaged through the object, whereby the objects surface will transform the source image based on the surface shape, texture, and color. The camera lens produces an image on the camera sensor of the light source as the image is reflected (transformed) from the target 150*a* or 150*b*. Light shaping films can be used to amplify the source radiance. A polarizer can be placed over the light source. A polarizer and pattern can be used together.

A crossed-polarizer arrangement can be implemented by placing a linear polarizer over the light source emitter area and another linear polarizer over the input to the camera lens, with the polarization angles between the two being aligned orthogonally. With this arrangement, specular reflections can be eliminated while allowing randomly polarized diffuse light to pass through to the camera sensor. This is useful for applications where surface reflection glare can saturate images, such as with shiny metal features on a circuit board.

Figure 4:
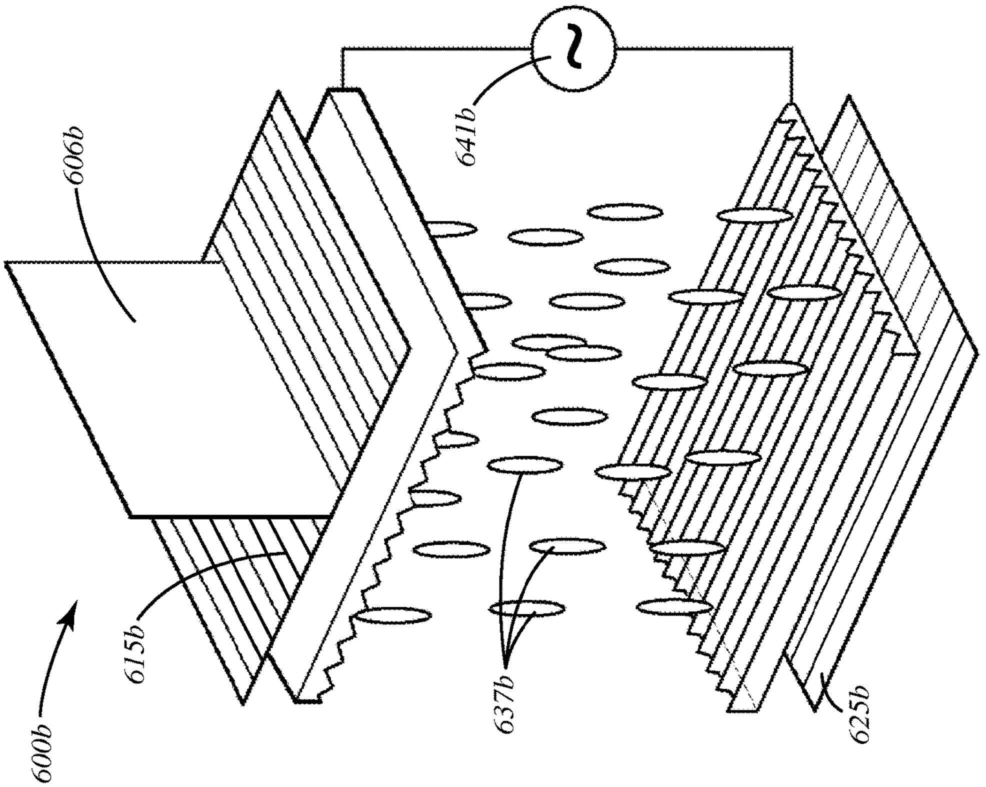
FIGS. 3 and 4 depict an example machine vision system incorporating a liquid crystal device.
Figure 3:
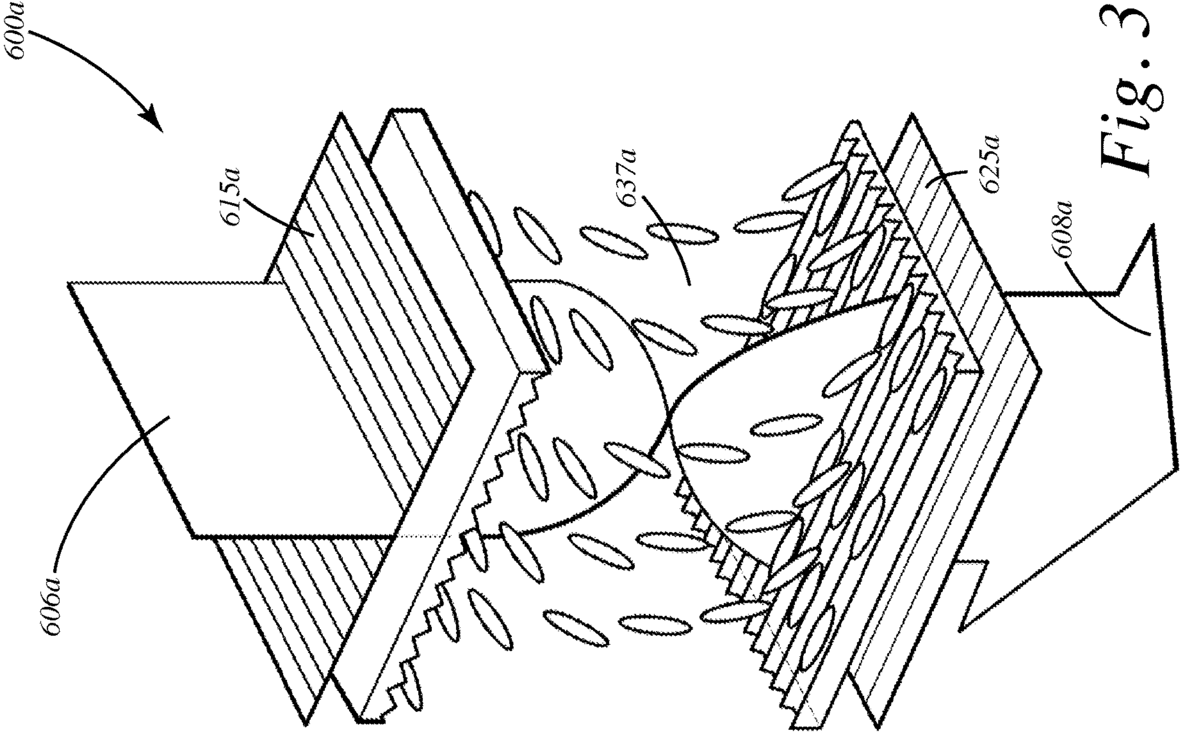

FIGS. 3 and 4 depict a part of machine vision system 100*a* or 100*b* (not shown) incorporating a liquid crystal device 600*a* or 600*b*, and illustrate a functional diagram. Light 606*a* or 606*b* enters the liquid crystal device 600*a* or 600*b*. The liquid crystal device 600*a* or 600*b* has a proximal polarizing film 615*a* or 615*b* on one end, and a distal polarizing film 625*a* or 625*b* on the other end. The polarization axis of the distal polarizing film 625*a* or 625*b* is 90° out of phase with the polarization axis of the proximal polarizing film 615*a* or 615*b*. An electrical charge 641*b* causes unaligned liquid crystals 637*a* to align as aligned liquid crystals 637*b* and keep the same polarization of light as what enters the liquid crystal device 600*b*. When not energized, the unaligned liquid crystals 637*a* rotate the light 606*a* from the distal polarizing film 625*a* to being in phase with the proximal polarizing film 615*a*. In other words, when the liquid crystal device 600*a* is not energized, the unaligned liquid crystals 637*a* rotate the light 606*a* polarization 90 degrees to generate light 608*a* below distal polarizing film 625*a*. Whereas when the liquid crystal device 600*b* is energized, the aligned liquid crystals 637*b* do not rotate the light 606*b* polarization 90 degrees and no light emits below distal polarizing film 625*b*. A liquid crystal device 600*a* or 600*b* may be used as an electronic shutter. This allows light to pass through when not energized and be blocked when energized. Notably, the machine vision system 700 of FIG. 5 may represent an example of a liquid crystal device 600*a* or 600*b* in which the liquid crystal device 600*a* or 600*b* was removed and replaced with proximal polarizing film 615*a* and distal polarizing film 625*b*. While the liquid crystal device 600*a* or 600*b* is illustrated as a twisted nematic device, the liquid crystal device 600*a* or 600*b* may include any suitable replacement (e.g., a smectic cell, a cholesteric cell, a linear polarizer, a circular polarizer, etc.).

Figure 5:
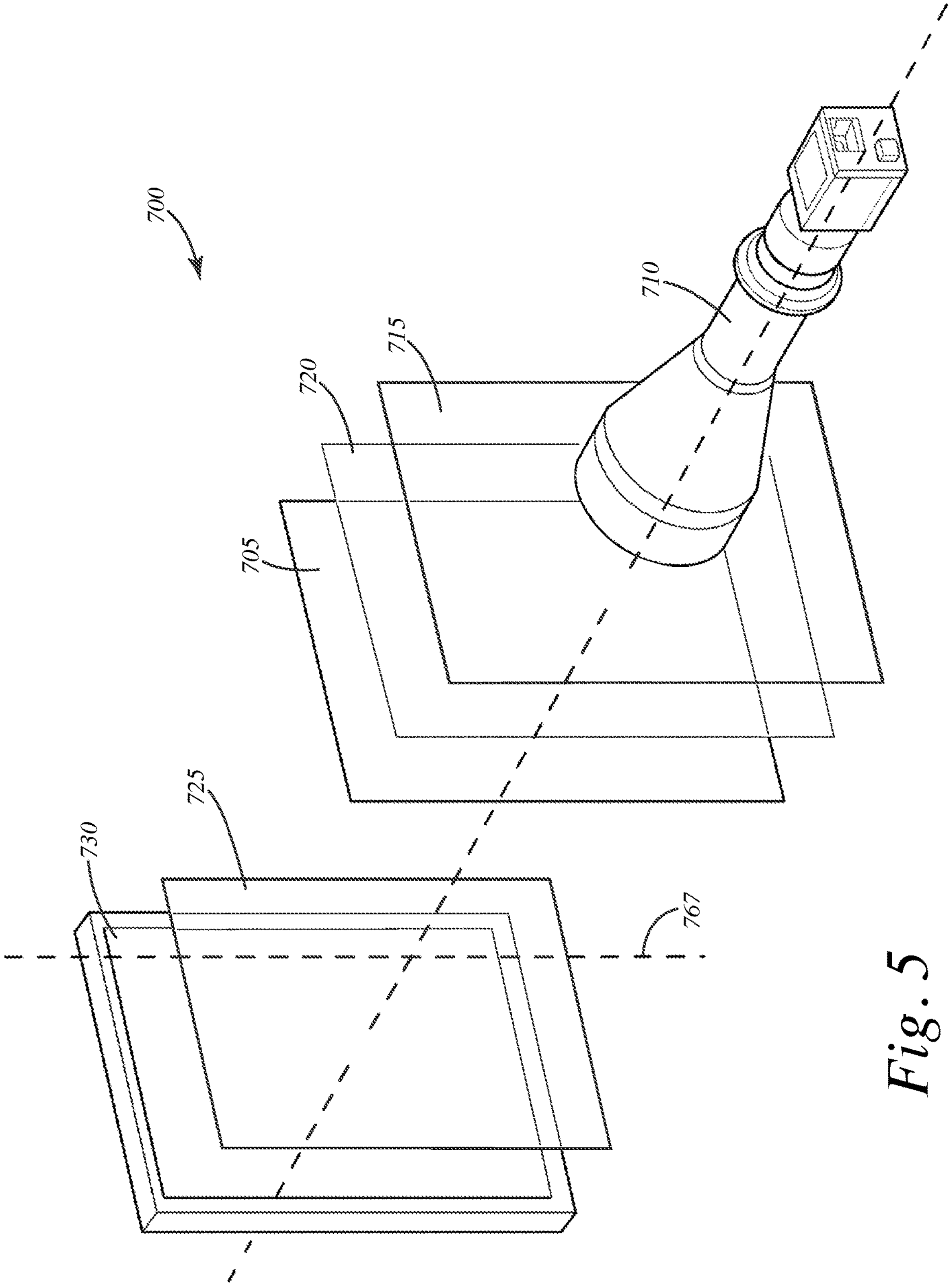
FIG. 5 depicts an example machine vision system incorporating a first polarizer between a light source and an object and a second polarizer and a liquid crystal device between the object and a camera.

FIG. 5 depicts a machine vision system 700 incorporating proximal polarizing optical film 715 and distal polarizing optical film 725 on opposite sides of an inspection object 705 and between an imager 710 and a light source 730. An imager can be a camera (e.g., a CCD camera) alone, or including one or more external optical components (e.g., lenses, mirrors, etc.). A multitude of mirrors may be arranged around a container to combine various views of the container within a resultant field of view of an imager 710. Reference to an optical axis 767 of an imager, as used herein, refers to an axis of an optical path of the imager in the region where the optical axis passes through an object being inspected. Thus, for example, the use of a mirror may result in the optical axis of an imager being orthogonal to the central axis of a container, even if the imager itself is facing a direction that runs parallel to that central axis.

FIG. 5 also may illustrate modification of the liquid crystal device 600*a* and 600*b* by removing the distal polarizing film 625*a* or 625*b* on the incoming side and placing the distal polarizing optical film 725 in front of the light source 730 so that the object is in between the distal polarizing optical film 725 and the modified liquid crystal device 720, which allows the polarizing effect to be switched on or off (by de-energizing or energizing the liquid crystal device 600*a* or 600*b*), allowing both filtered and unfiltered images to be captured. Accordingly, the machine vision system 700 can electronically switch polarization on/off with no mechanical parts.

Other types of inspections, such as inspections for defects on a crimp and cracks in container glass, may be negatively impacted with polarizing filters in place. Thus, a liquid crystal device 600*a* or 600*b* can rapidly switch polarizing filters on or off, such that associated inspections can be performed at high speed with a minimal number of imagers (i.e., an image may be acquired with the liquid crystal device 600*a* or 600*b* energized, and another image may be acquired with the liquid crystal device 600*a* or 600*b* de-energized).

Figure 6:
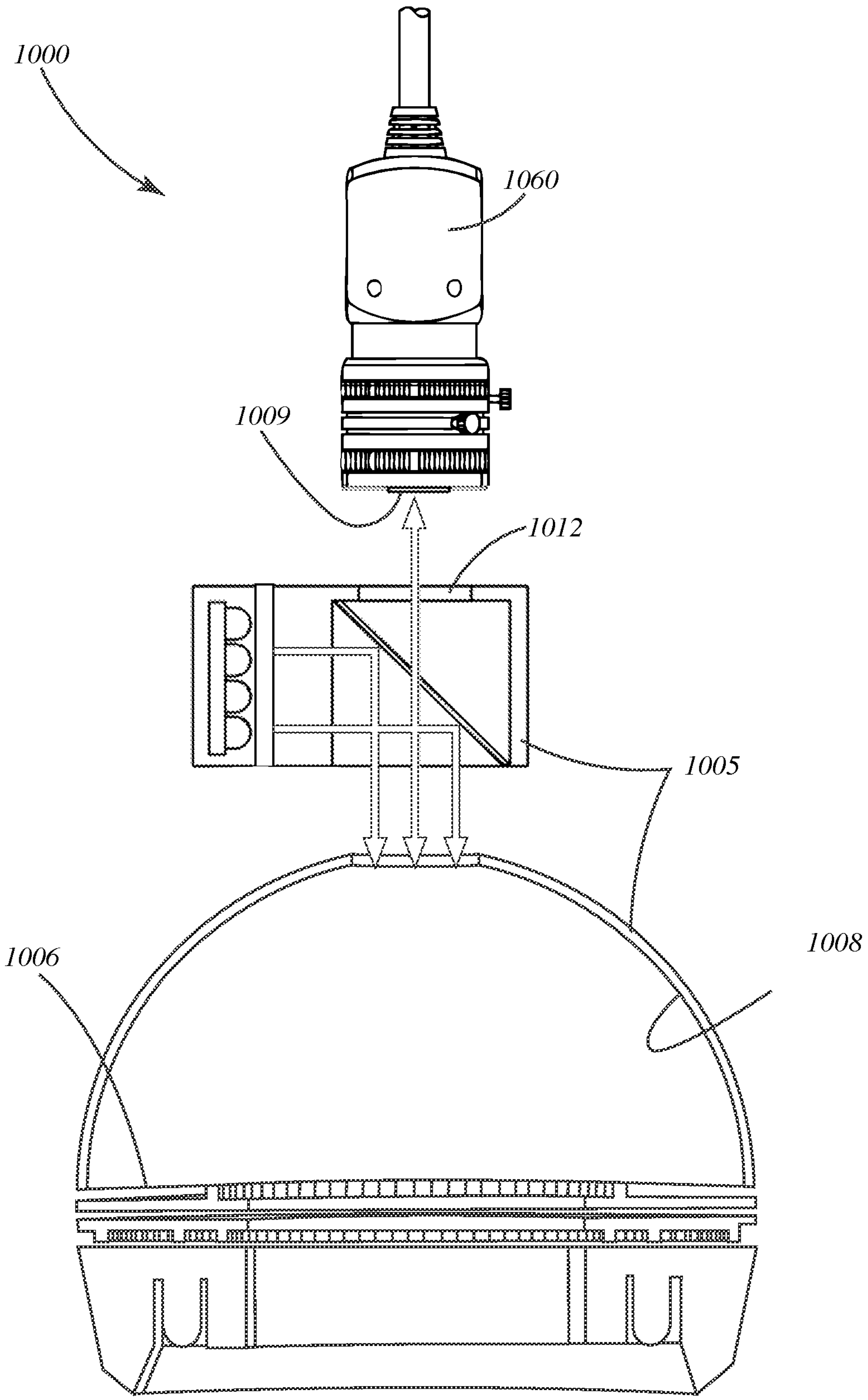
FIG. 6 depicts an example machine vision system incorporating an example multi-function illumination source.

FIG. 6 depicts a machine vision system 1000 which may incorporate a multi-function illumination source 1005. A multi-function illumination source 1005 may include a combination of any of the individual lights as described herein. A multi-function illumination source 1005 may include, although not all shown, a dual-sided electrical printed circuit board having a first set of light emitters 1006 (e.g., LEDs) on a first side and oriented in a first direction, a second set of light emitters (e.g., LEDs) on a second side and oriented in a second direction, a third set of light emitters on a third side and oriented in a third direction, and a fourth set of light emitters on the fourth side and oriented in a fourth direction, etc. The first side of the printed circuit board may be opposite the second side of the printed circuit board and the first direction may be, for example, 180° with respect to the second direction. While the multi-function illumination source 1005 is shown to include four sets of light emitters, any multi-function illumination source 1005 may include more, or less, sets of light emitters. Alternatively, the dual-sided electrical printed circuit board may be replaced with a first single-sided printed circuit board and a second single-sided printed circuit board.

The multi-function illumination source 1005 may include, for example, a concave reflector 1008 configured to cooperate with the first set of light emitters 1006 to produce a light similar to, for example, a dome light. The multi-function illumination source 1005 may include a diffusing optical element configured to cooperate with the second set of light emitters to produce a diffuse light. The multi-function illumination source 1005 may include a collimating optical element configured to cooperate with the third set of light emitters to produce a direct light similar to, for example, a coaxial patterned illumination source 105*a*.

The multi-function illumination source 1005 may include a camera aperture for incorporation of a camera 1060. The camera 1060 may include an electric power/control connection and a cameral optical element (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). The controller 1178*a* shown in FIG. 7 may selectively generate camera control signals to, for example, selectively control the camera 1060 and/or the camera optical element. For example, the controller 1178*a* may selectively energize a particular light emitter, or group of light emitters, and may synchronize activation of the camera 1060 to acquire an image of a target 150*a*. Additionally, or alternatively, the controller 1178*a* may selectively control the camera optical element in synchronization with activation of the camera 1060. Additionally, or alternatively, the multi-function illumination source 1005 may include manual controls to, for example, enable a user to manually adjust a camera optical element.

The controller 1178*a* may be configured to control a camera 1060 (e.g., a shutter control, an auto-exposure control, a pixel integration time, a frame capture size, etc.), a camera optical element (e.g., an aperture control, a zoom control, a focus control, etc.), and a multi-function illumination source 1005 (e.g., on/off control, an intensity control, a color control, a pattern control, etc.). The controller 1178*a* may interface with a camera 1060 via, for example, a virtual interface layer (e.g, Advanced Optics Group GenICam®) and a physical interface (e.g., Ethernet, USB, Camera ink High peed, CoaXpress®, GigE Vision, USBVision, CameraLink, CameraLinkHS, etc.). The controller 1178*a* may interface with a camera optical element via, for example, a virtual interface layer and a physical interface. The controller 1178*a* may interface with a coaxial patterned illumination source 105*a* or 105*b* via, for example, a virtual interface layer and a physical interface.

In addition to being adapted to attach to a camera 1060, the multi-function illumination source 1005 may be configured to be attached to a robot and/or a coaxial patterned illumination source 105*a* or 105*b*. The controller 1178*a* may transmit a control signal to, for example, a robot controller to reorient a physical position of the multi-function illumination source 1005 with respect to a target 150*a* or 150*b*.

While not all shown in FIGS. 6, the multi-function illumination source 1005 may include a bottom housing portion (e.g., a lens, a spectral filter, a polarizer, a diffuser, a spatial filter, a liquid crystal display, a switchable film, polymer dispersed liquid crystals, an electrochromic device, a photochromic device, a sub-combination thereof, a combination thereof, etc.). The aperture 1009 may extend through the bottom housing portion 1012. Alternatively, the bottom housing portion 1012 may close off an end of the aperture 1009. In any event, the controller 1178*a* may selectively control the bottom housing portion 1012 in synchronization with activation of the camera 1060.

A multi-function illumination source 1005 may be configured with, for example: all-in-one lights (e.g., Do all™); multi-functional light (e.g., direct light, dark field light, bright field light, diffuse light, back light, structured lighting, gradient lighting, dome lighting, stereometric lighting, polarized light, etc.); independent controls; modularity; multi-wavelength; user configurable; embedded controls; software/hardware/lights (combined functionality); modules to communicate with a controller; camera mounting/controls; and/or dynamically configurable multiplexing. A machine vision system 1000 may use a multi-function illumination source 1005 and camera(s) to inspect objects in a manufacturing and/or automated processing environment. Associated machine vision lighting applications may vary widely based on an object being illuminated. Objects can vary in shape, reflectivity, color, texture, and depth. These variations can make imaging difficult. There are many different types of machine vision lighting: diffuse lighting, dark field lighting, bright-field lighting, back lighting, dome lighting, structured lighting, stereometric lighting, and many other types. Machine vision lighting system types may vary depending on an intended application. A multi-function illumination source 1005 may be specified and arranged specifically for an intended application. An associated machine vision lighting system may be configured for a specific type of inspection for a specific object.

Once a machine vision system is configured, the machine vision system is usually only suitable for inspection of a specific object for which the machine vision system was configured. In many cases, if a user wants to inspect different types of objects, or the same object with slight variations in features, a lighting system often must be reconfigured or changed. Robotic inspection systems, using specific lighting arrangements (attached to the robot), may be used to inspect many different types of objects. This presents a special case in lighting and vision where the specific object and environment becomes arbitrary. In robotic inspection, the type of arbitrary object that the vision system is able to discriminate can be limited by the type of light being used. A multi-function illumination source 1005, on the other hand, combines into one system common types of machine vision lighting types and methods to enable users to expand capabilities of an associated machine vision system, and to enable many different types of inspections with a singular lighting system.

A multi-function illumination source 1005 may allow a user to, for example, perform many types of inspections using one lighting system. In many cases, a multi-function illumination source 1005 may be used with an associated imaging system to capture multiple images under different lighting conditions (e.g., color, spatial changes, patterns, bright-field, dark-field, ultraviolet, short wave infrared, etc.) to enable machine vision system discrimination of features associated with a respective target. A multi-function illumination source 1005 may include capabilities of a camera imaging system that may be expanded. In known lighting arrangements, on the other hand, a machine integrator would need to mount several different types of lights to achieve a similar effect.

A multi-function illumination source 1005 may combine several common types of lighting features into a singular system (i.e., may feature a group of lights that perform a certain type of illumination). Lighting features may include, but are not limited to LED wavelengths and wavelength ranges available as either LED or laser light sources. A multi-function illumination source 1005 may be operated dynamically, where lighting angle, zone from which the light originates from, wavelength, pattern, diffusion angle, can be controlled independently. This allows users to capture multiple images for post processing to combine the various lighting configurations into one image. A multi-function illumination source 1005 may be operated dynamically during the capture of a single image in order to effectively achieve the same effects one would get with image post processing. A multi-function illumination source 1005 may be operated in a manner where multiple lighting features can be enabled at the same time to produce customized lighting schemes. A multi-function illumination source 1005 may be modified or configured to add on lighting features. A multi-function illumination source 1005 may be configured with a variety of different lens types, whereby the features in the lenses may shape light and direct the light in a predetermined direction.

A multi-function illumination source 1005 may include a multifunctional lens shape, and may direct light that originates from a specific zone on an LED board. This may enable the light to produce dark-field, bright-field, diffuse, directional, and other types of light depending on the application. A multi-function illumination source 1005 may include optics that may be changed by, for example, removing a lens and inserting a different type of lens. A multi-function illumination source 1005 may be controlled with an external or internal controller that uses either direct triggering or digital communications. A multi-function illumination source 1005 may contain internal power driver circuitry and/or may be powered with external power drivers. A multi-function illumination source 1005 may contain an embedded microprocessor and/or a field programmable gate array that can handle input and output operations to, for example, enable communications between other devices and control power distribution to various regions within the lighting system. A multi-function illumination source 1005 may contain a memory that enables a user to store configurations which may allow the user to customize and store the configuration of the multi-function illumination source 1005. A multi-function illumination source 1005 may contain data logging abilities to store information such as temperature, light intensity, operating time, humidity, and the occurrence of past events. A multi-function illumination source 1005 may, for example, communicate directly with a camera system, where the camera system can directly control or configure multi-function illumination source 1005. A multi-function illumination source 1005 may be controlled externally by a module that provides power to the individually controlled light zones. A multi-function illumination source 1005 may be controlled externally by a controller that provides proportional control level signaling. A multi-function illumination source 1005 may include an ability to perform power and/or control multiplexing, which may enable a user to control many different aspects of the multi-function illumination source 1005 without requiring a separate control line for each of the independently controlled light zones. A multi-function illumination source 1005 may include lighting modules, such that an end effector can be selected by a robot based on application. A multi-function illumination source 1005 may include controls to form a feedback loop with a camera system (e.g., referencing color target, using arbitrary camera system with our controls and lighting system to stabilize output, etc.).

Figure 7:
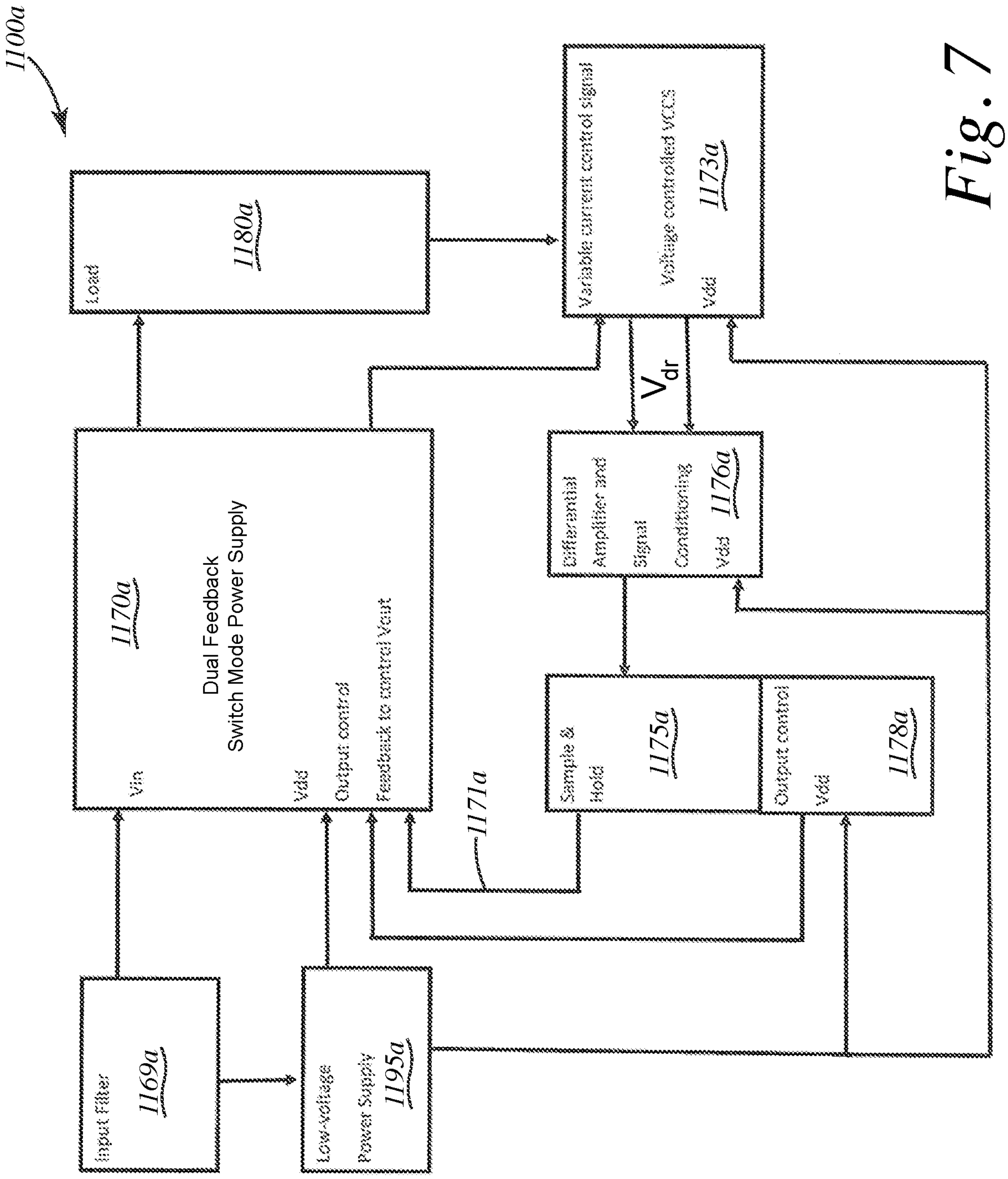
FIGS. 7-9 depict an example light emitting diode (LED) drive for use within a machine vision system.
Figure 8:
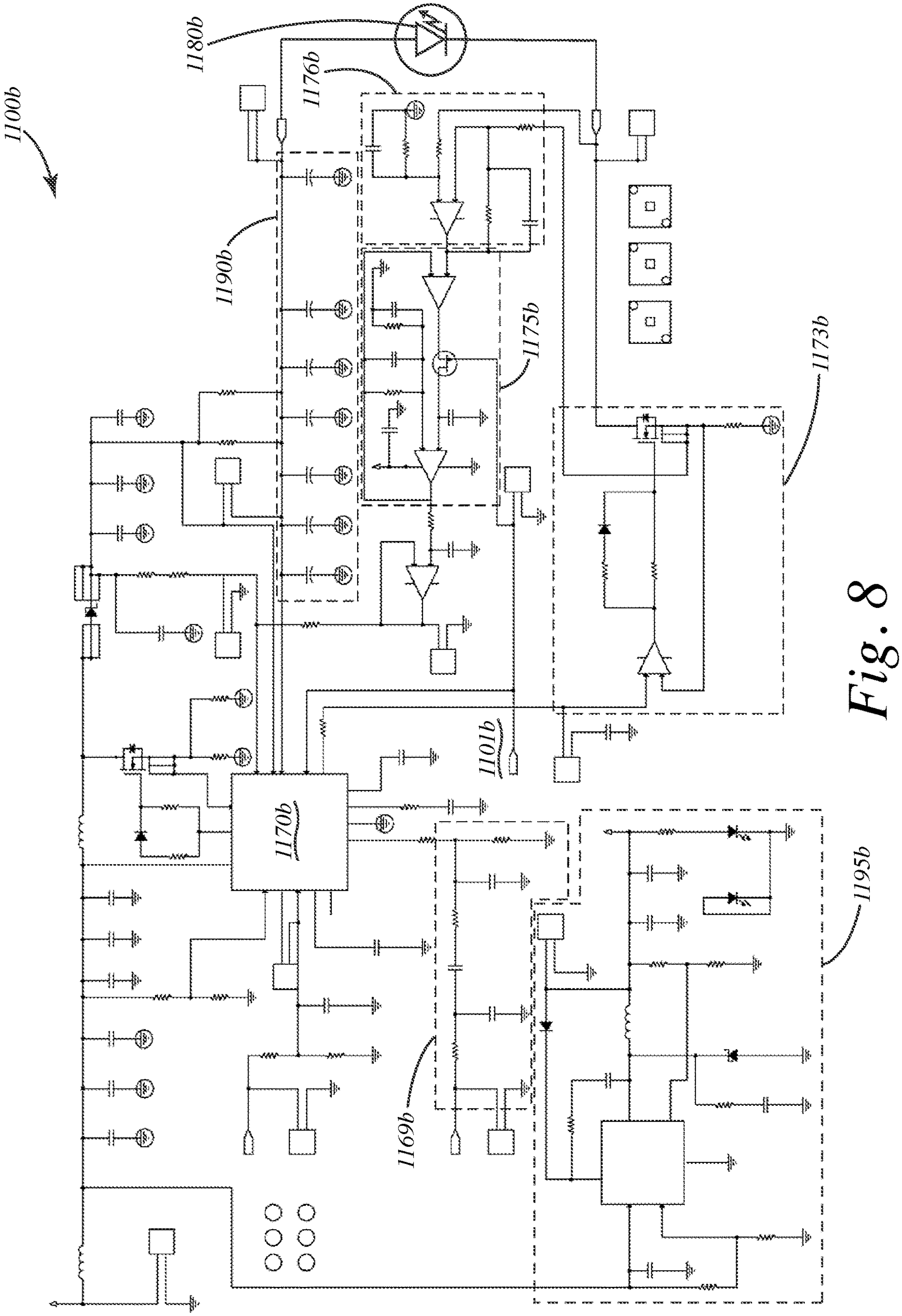
Figure 9:
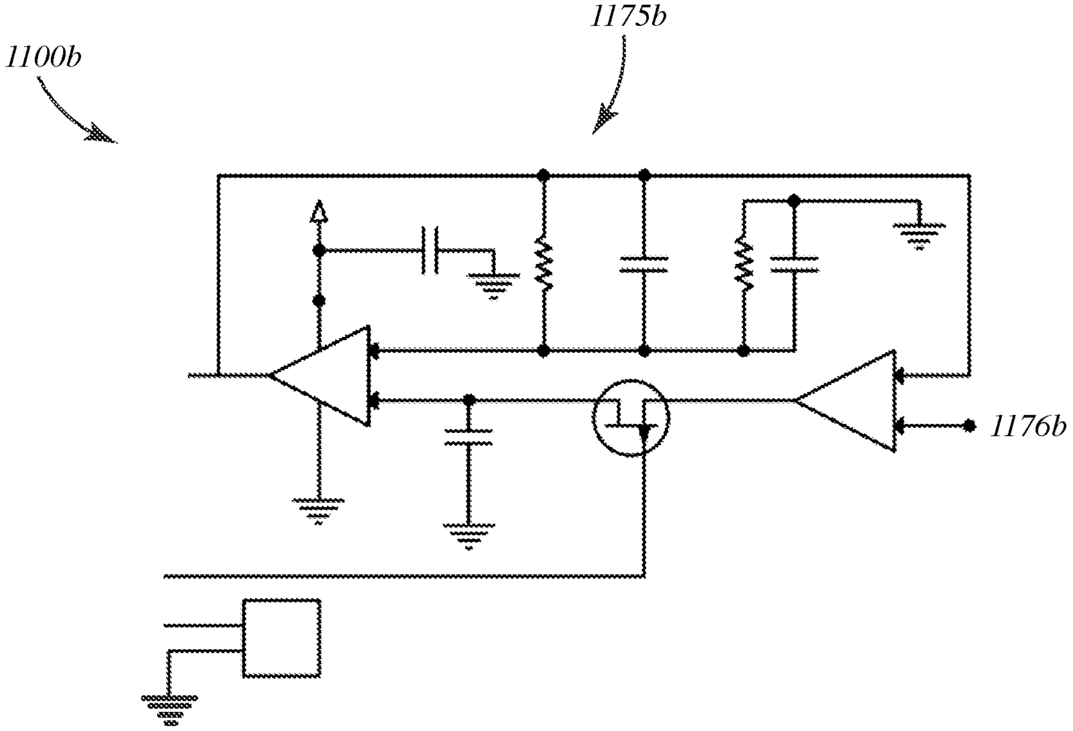

In FIG. 7, LED drive **1100*a* may include a low voltage power supply 1195*a*, a power supply filter 1169*a* (e.g., a dithering circuit, etc.), variable voltage switch-mode power supply 1170*a* (e.g., a dual feedback switch-mode power supply, etc.), and series of LEDs 1180*a*. In addition to receiving an input from the low voltage power supply ($V_{dd}$) and an input from the filtered power supply ($V_{in}$), the variable voltage switch-mode power supply 1170*a* may receive an output control (e.g., an LED-on signal from a controller 1178*a*, an illumination-on signal from camera 1060, output from sample-and-hold circuit 1175*a***, etc.) and a feedback (e.g., a drain-to-return voltage ($V_{dr}$) of the current sink, etc.) to control an output voltage ($V_{out}$) relative to $V_{dd}$.

In FIGS. 8, 9, 11, and 12, an LED drive **1100*b*, 1200*a*, or 1300 may include sample-and-hold circuit 1175*a*, 1175*b*, or 1275*a*; a differential amplifier 1176*a*, 1176*b*, 1276*a*, or 1376; a combined voltage-controlled current sink and sample-and-hold circuit 1373; a low voltage power supply 1195*a*, 1195*b*, or 1295*a*; a power supply filter 1169*a*, 1169*b*, 1269*a*, or 1369 (e.g., a dithering circuit, etc.); and an energy storage device 1190*b*, 1290*a*, or 1390 (e.g., capacitors, etc.). The output of a differential amplifier 1176*a*, 1176*b*, 1276*a*, or 1376 may be an input to a control port of a sample-and-hold circuit 1175***a*, 1175*b*, or 1275*a*.

The LED drive 1100*a*, 1100*b*, or 1200*a* may include a full-scale load response time that is, for example, less than a predetermined value (e.g., less than 1 microsecond, dependent on an object inspection time, between 0.8 microseconds and 2.4 microseconds, etc.). Accordingly, an LED drive 1100*a*, 1100*b*, 1200*a*, or 1300 may be incorporated into a machine vision system 100*a* or 100*b*, having a low object inspection time.

Alternatively, or additionally, the LED drive 1100*a*, 1100*b*, 1200*a*, or 1300 may include an adjustable steady state current. Thereby, a steady state current of the LED drive may be adjusted by a user based on a user-defined lighting application.

High efficiency is achieved by reducing the output voltage of the switch-mode power supply to a minimum working value while supporting the current requirements. This is made possible by sensing $V_{dr}$ of the LED current sink (i.e., a voltage controlled current source) using a differential amplifier along with a sample-and-hold. A tailored feedback voltage replaces the normal ground reference of the Voltage Loop Feedback Pin. The output of the switch-mode power supply decreases as the sampled $V_{dr}$ rises thereby lowering the power dissipation of the drive circuit.

The fast response time is derived by discharging stored energy in a capacitor bank. Steady state operation is optimized using the current control feedback and the voltage is adjusted by monitoring the $V_{dr}$ of an LED current sink 1173*a*, 1173*b*, or 1273*a*, or the combined voltage-controlled current source and sample-and-hold circuit 1373.

LEDs are typically grouped together in so-called bins with other LEDs of similar performance to avoid deviations. Binning is particularly advantageous for LEDs with output in a white light spectrum. Even so, LEDs may include: variations in output due to temperature shifts, variations of $V_f$ due to alternate bins of LEDs, variations of $V_f$ due to alternate LED die material, etc.

A variable voltage switch-mode power supply 1170*a* or 1170*b* may automatically adjust an output rising or falling LED forward voltage due to die temperature shifts as well as variations of $V_f$ from alternate BINs or $V_f$ of alternate die material. Current control can be either a current source or current sink. The reduction of power dissipation will allow for more energy to be delivered in a same-size pack capability, which can be expanded to multiple channels and current tailored, both of which are limited by product physical dimensions. Improved efficiency translates into lower operating cost. The variable voltage switch-mode power supply may be a soft-start dual feedback switch-mode power supply. The sample-and-hold trigger 1171*a* may correspond to a timed pulse or a steady state current to adjust the voltage of the switch mode power supply. In the present shown configuration the field effect transistor (FET) will turn on faster than turning off. The circuit may slow down the turn on and speed up the turn off of the series of LEDs 1180*a*, 1180*b*, 1280*a*, or 1380. The capacitor on the lower right of variable voltage switch-mode power supply 1170*b* provides a soft start to limit in-rush current.

Figure 10:
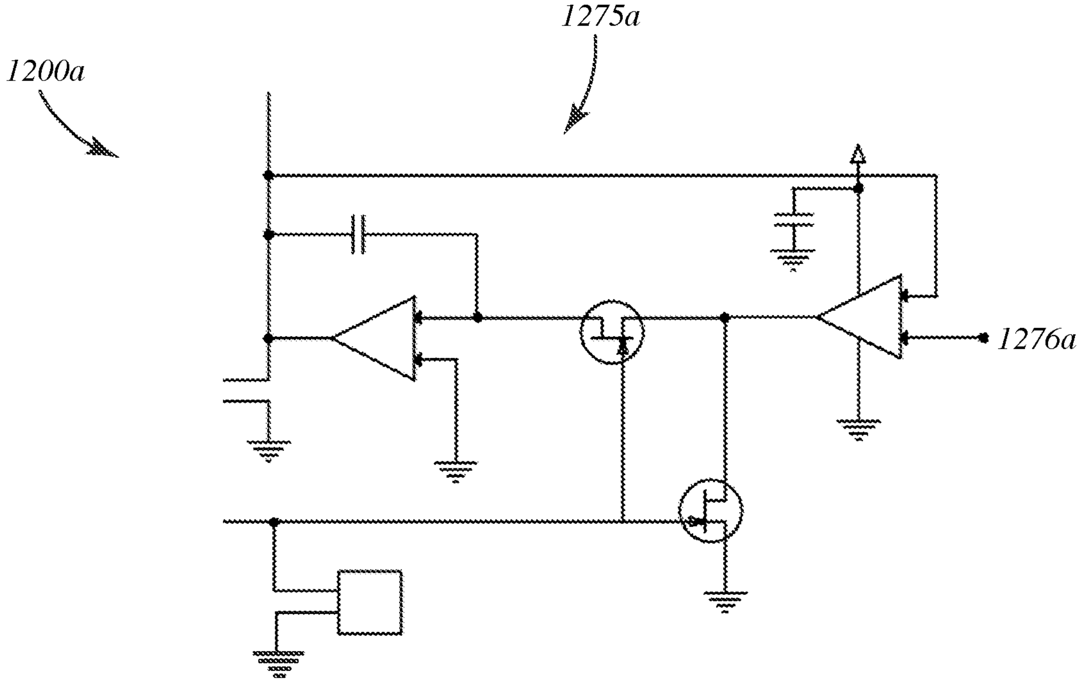
FIGS. 10 and 11 depict an example LED drive circuit for use within a machine vision system.
Figure 11:
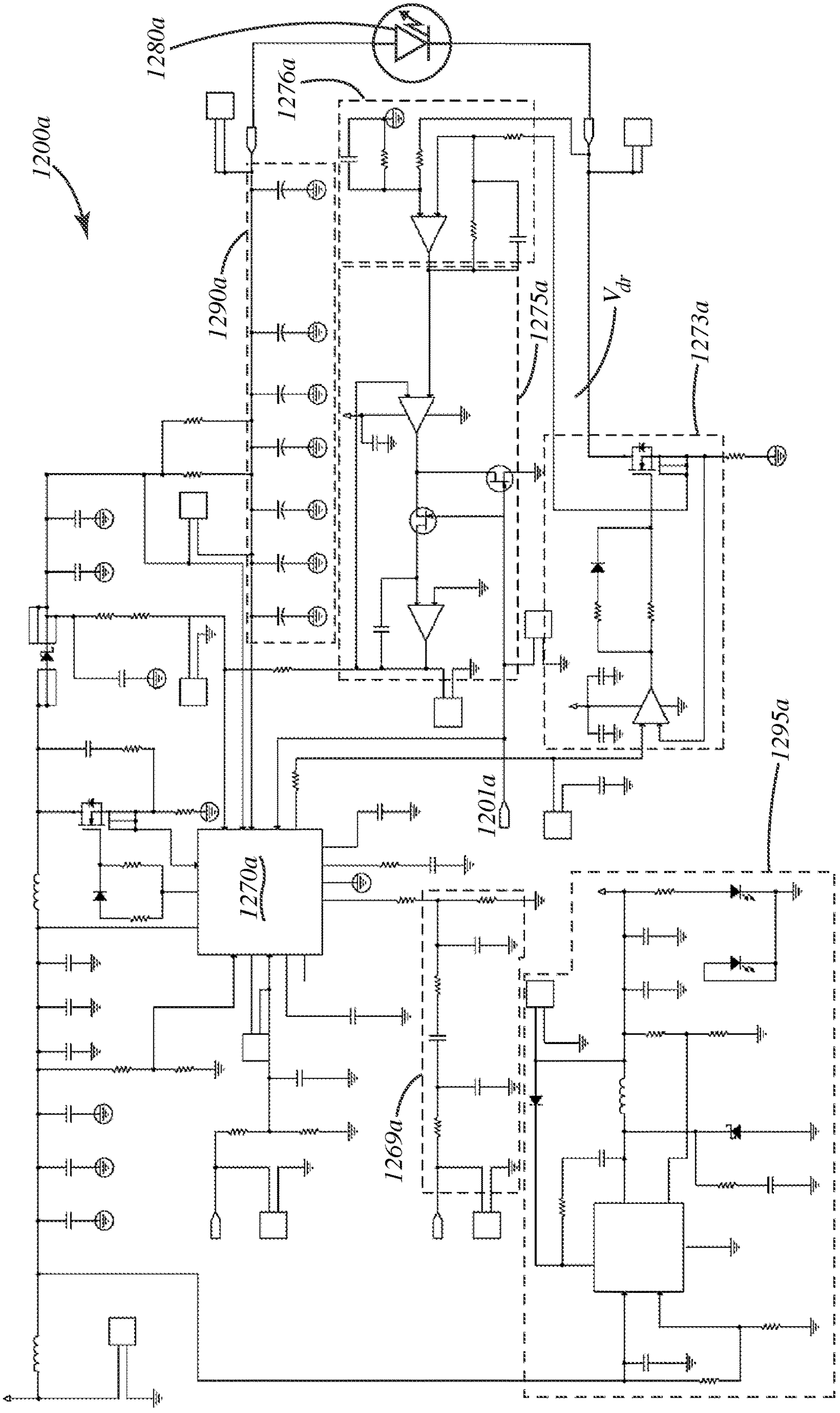

FIGS. 11 and 10 (enlarged for clarity) depict a multi-modal, high-efficiency, LED drive for industrial machine vision application.

Signal 1101*b* and signal 1201*a* are sample-and-hold triggers that correspond to a timed pulse or steady state current to adjust the voltage of the switch mode power supply. In the present shown configuration the FET will turn on faster than turning off. It is typical to slow down the turn on and speed up the turn off. 1280*a* represents a series of LEDs. The capacitor on the lower right of switch-mode power supply 1270*a* provides a soft start to limit in-rush current.

Figure 12:
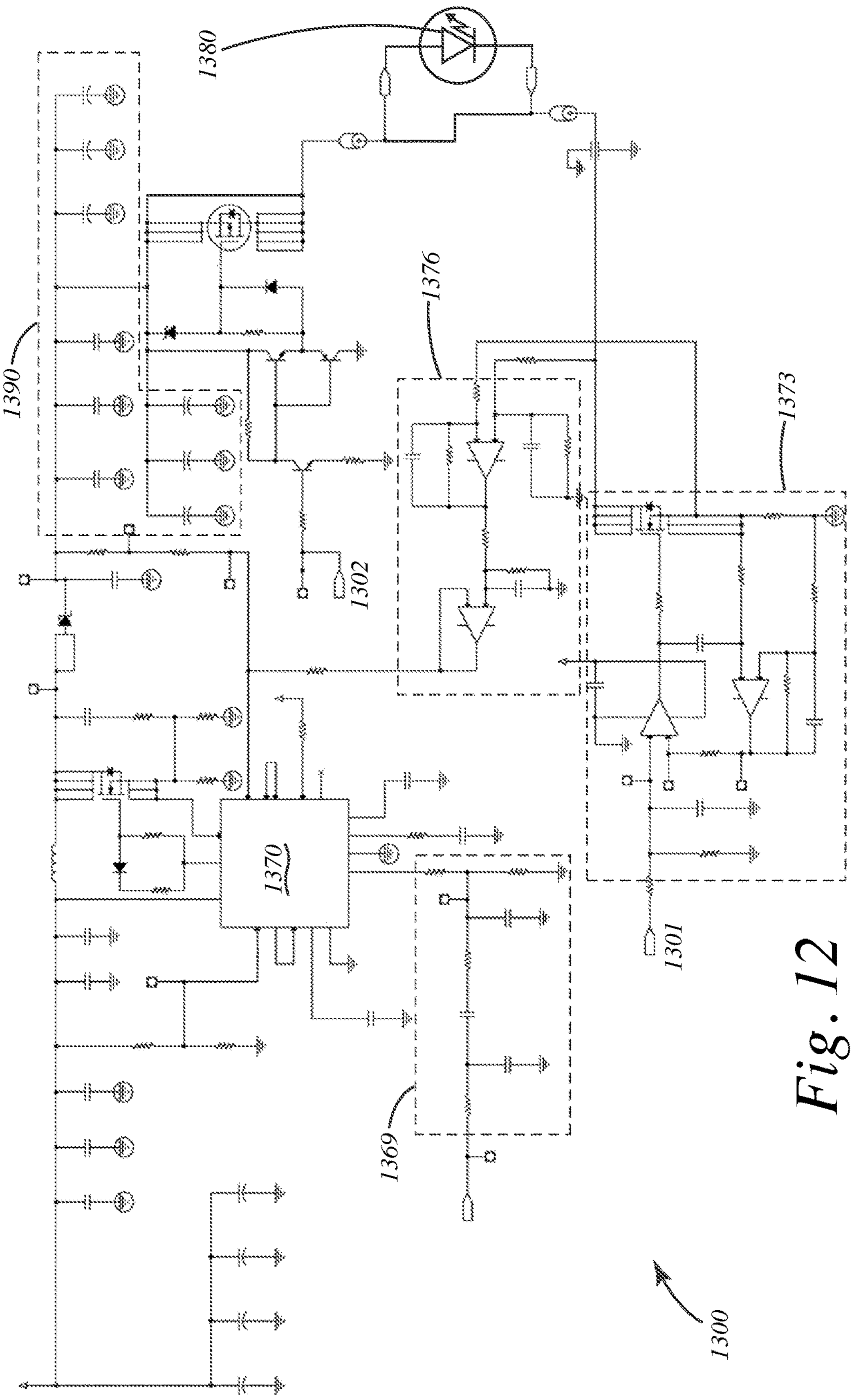
FIG. 12 depicts an example LED drive circuit for use within a machine vision system.

In FIG. 12, the sample-and-hold circuit is removed and the switch-mode power supply 1370 output voltage is dynamically controlled in real time. The capacitor on the lower right of switch-mode power supply 1370 provides a soft start to limit in-rush current. 1380 represents a series of LEDs. The LED drive 1300 includes a high side switch and a more elaborate voltage controlled current sink eliminating the need for a sample-and-hold circuit.

To implement a hidden strobe on this topology, the control pins, drive signal 1301, and pulse width modulation signal 1302 are manipulated to time average a strobe that equals an average constant light intensity prior to and subsequent to the strobe duration.

A hidden strobe may be implemented using a programmable LED Light Manager (LLM). Any one of the LED drives 1100*a*, 1100*b*, 1200*a*, or 1300 may be configured as a plug ‘n play device. The drive signal 1301 and the pulse width modulation signal 1302 may be a positive-negative-positive (PNP) signal or a negative-positive-negative (NPN) signal.

The LED drive 1100*a*, 1100*b*, 1200*a*, or 1300 may be configured with an overdrive mode of operation. Overdrive gives users the benefit of more intensity than in continuous mode, but requires strobed operation at a specified duty cycle. This strobed operation at a low duty cycle, typically 3-10%, causes bright flashing that can unintendedly affect users or other personnel nearby. In many cases, this can be more than annoying and result in seizures, headaches, or safety issues. It is not always possible to provide shielding between the lights and the personnel. A dual overdrive (e.g., DECA drive) technology increases the benefits, but a dual overdrive technology also aggravates the issues with personnel in the area.

The LED drive 1100*a*, 1100*b*, 1200*a*, or 1300 may be configured to address the fact that infrared and ultraviolet lights both wash out the bar code label. For example, an LLM can mitigate the user issues with flashing but still provide the benefits associated with overdrive (e.g., 5 times a maximum LED continuous rating) and dual overdrive (e.g., 10 times a maximum LED continuous rating) light.

The LED drive 1300 may include two position sensor input triggers: drive signal 1301 and pulse width modulation signal 1302. At the cost of positional accuracy, a single trigger input mode of operation may be desirable. Conversely, when there is a highly variable velocity and spacing between incoming products, a three-position sensor mode of operation may be required in the future.

Figure 13:
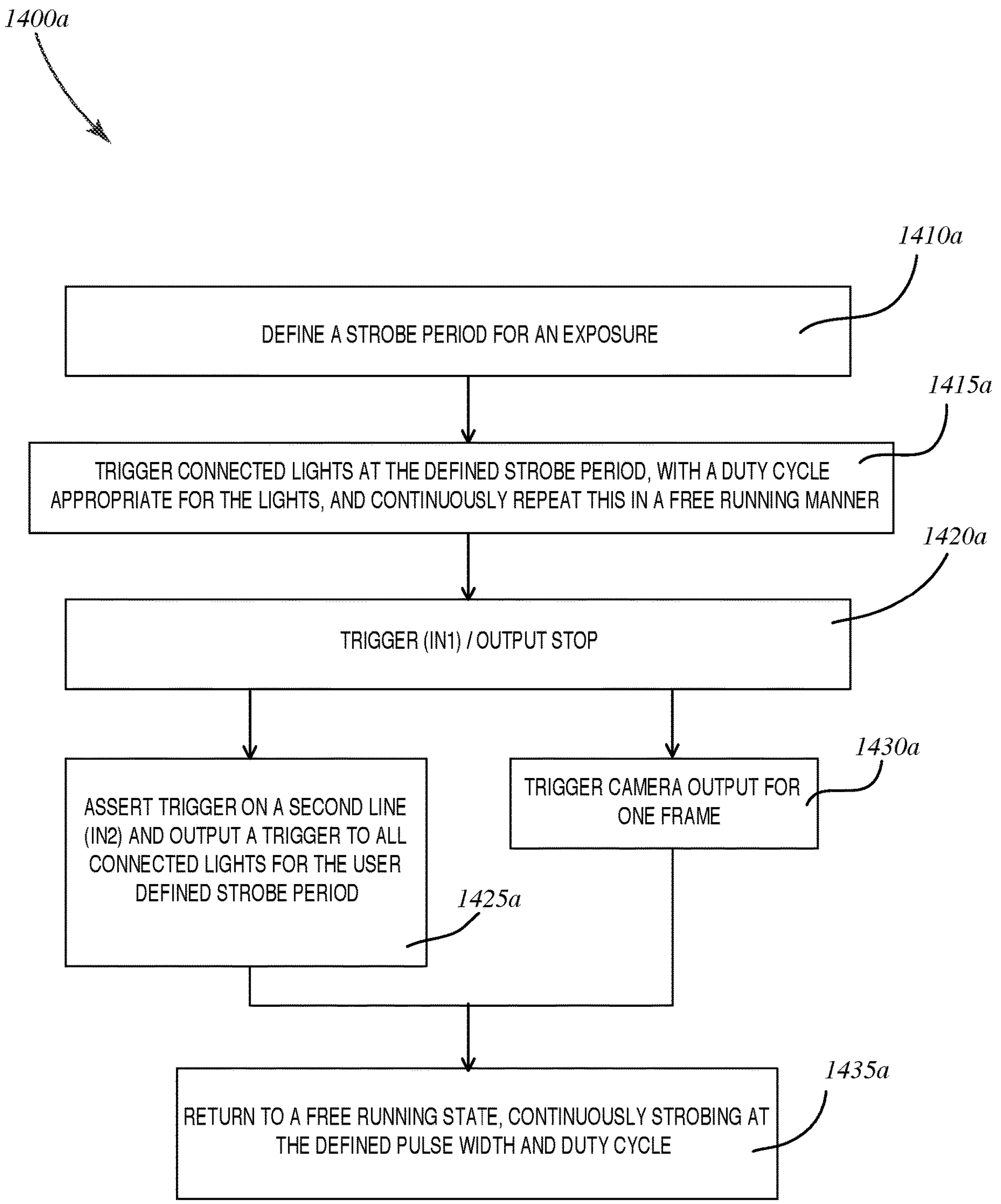
FIGS. 13-16 depict an example method of operating a LED drive circuit.

The flow diagram in FIG. 13 covers a hidden strobe system with a separate controller (LLM) using a two-step trigger method to regulate the pulse inputs to keep the light output essentially steady (not flickering). The LLM fills in the missing pulses between the actual camera strobe requests to make the strobe appear continuously on. With energy management technology 1400*a*, a user may define a strobe period for an exposure (block 1410*a*). The LLM will begin by triggering connected lights at the defined strobe period, with a duty cycle appropriate for the lights, and continuously repeat this in a free-running manner (block 1415*a*) until a trigger (In1) is asserted (block 1420*a*). At the In1 trigger, the output will stop until a trigger is asserted on a second line (In2) (block 1425*a*). When Trigger In2 is asserted (block 1425*a*) the LLM will output a trigger (e.g., PNP trigger, NPN trigger, etc.) to connected lights for the user defined strobe period (block 1425*a*) and also trigger the camera output (block 1430*a*) for one frame. After the frame is completed, the LLM will return to a free-running state (block 1435*a*), continuously strobing at the defined pulse width and duty cycle until another Trigger In1 signal restarts the sequence.

The effect is to see a light that appears to be continuously on until a product triggers the system. At this point a quick dark dropout occurs as the first trigger turns out the light(s) to arm and then restart on the second trigger. Unlike the bright flashing associated with a normally strobed system, this apparent constant on with a quick dark drop out for a cycle will be less offensive to nearby personnel and probably not even noticeable.

Figure 14:
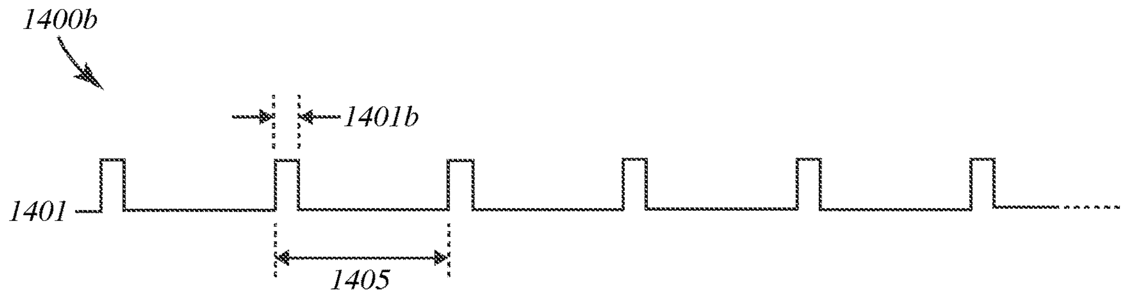

With reference to FIG. 14, the strobe period (P) may be created by a user to set the variable (e.g., range is 10 µS minimum to 1 mS maximum, etc.). A strobe cycle time 1405 equals the total period between the start of repeated free-running strobe output pulses 1401. To start, strobe cycle time 1405 can be programmed to be a fixed 35 times P. That will make this feature work effectively with lights down to a minimum 3% duty cycle. In the future, it is highly desirable to have a user input for duty cycle to set this period. That will allow the user to use this feature effectively over a wide range whether the user has a standard overdrive light at 10% duty cycle or a dual overdrive light at 3%.

The strobe cycle of energy management technology 1400*b* includes a PNP strobe output period 1401*b* and strobe cycle time 1405. The hidden strobe cycle of energy management technology 1400*c* includes a first trigger 1402*c*, a second trigger 1403*c*, a PNP strobe output 1401*c*, a camera trigger output 1404*c*, a time t1 1406, a time t1 1407, a time t2 1408, and a time t3 1409*c*. The energy management technology 1400*d* includes a first trigger 1402*d*, a second trigger 1403*d*, a PNP strobe output period 1401*d*, a camera trigger output 1404*d*, a time t1 1406, a time t1 1407, a time t2 1408, a time t3 1409*d*, and a user-programmable camera delay 1410*d*.

Figure 15:
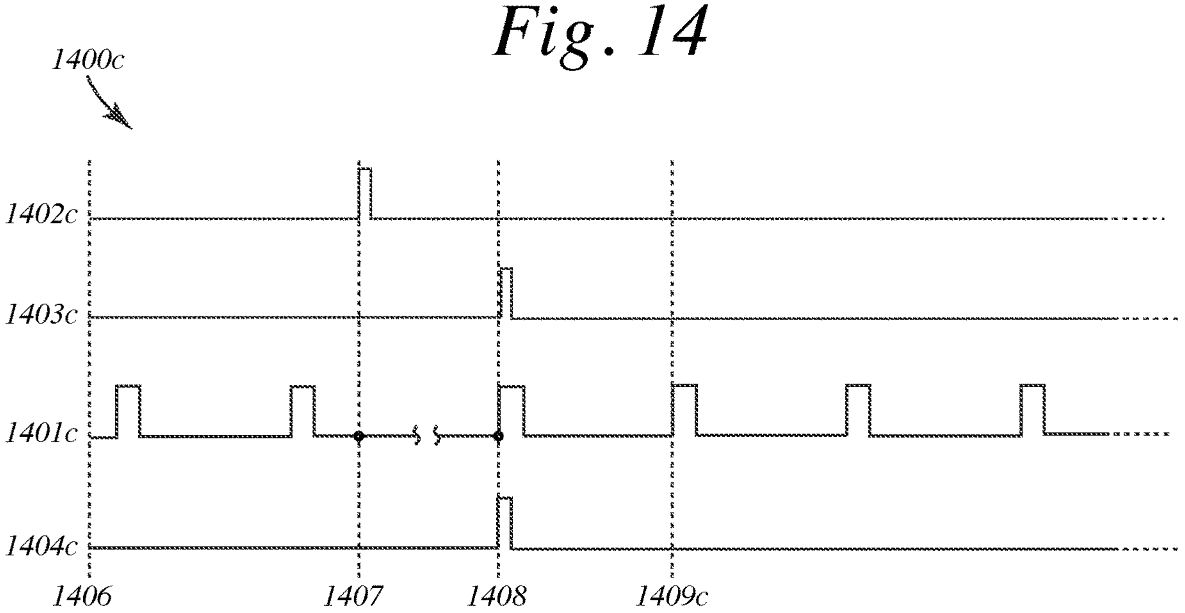

With reference to FIG. 15, at time t1 1406, the machine vision system with energy management technology is free-running with a continuous stream of PNP triggers to the output at the user-specified pulse width and defined cycle time. At time t1 1407, a user provided signal on Trigger In1 stops PNP strobe output pulses. The machine vision system with energy management technology is armed and waiting for the Trigger In2 signal. At time t2 1408, a second trigger signal is received on Trigger In2. The LLM simultaneously provides the defined pulse on both the PNP Strobe and Camera Trigger outputs. A single camera trigger is generated for a Trigger In2 assertion. At time t3 1409*c* or 1409*d*, the defined cycle time started at time t2 1408 ends, the machine vision system with energy management technology goes into free-running mode as at time t1 1406, and the machine vision system with energy management technology remains in this state until Trigger In1 is asserted.

Figure 16:
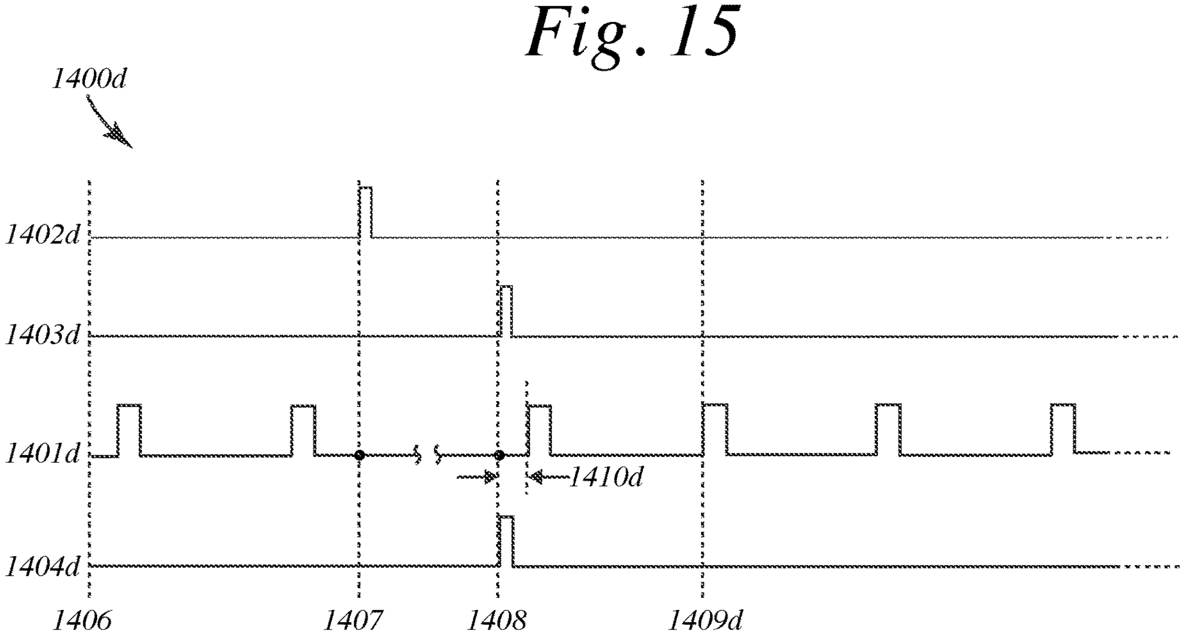

With reference to FIG. 16, there is a user-programmable camera delay 1410*d* because some cameras do not instantly reset in the µS range. Since strobe pulses may be down to 10 µS, the light may respond before the camera resets and starts an exposure. The user-programmable camera delay 1410*d* at t2 1408 between the camera and light trigger outputs is desirable to fine-tune the image capture.

Figure 17:
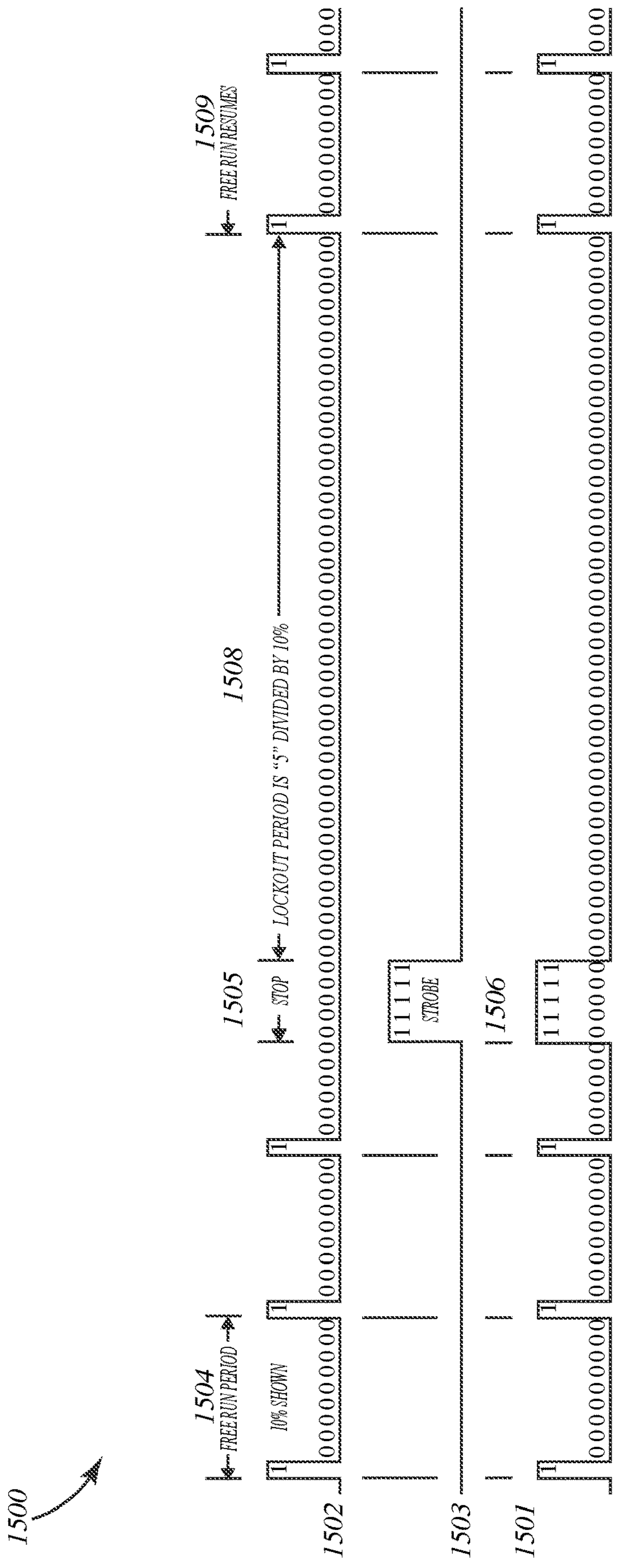
FIG. 17 depicts an example method of operating a LED drive circuit.

With reference to FIG. 17, another hidden strobe is incorporated into a typical light with integrated driver and will utilize one trigger event to interrupt the free-running pulse rate to follow the camera trigger for light output. The microprocessor measures the camera trigger on pulse time, then calculates a lockout period based on the duty cycle of free-running pulses, and then restarts the free-running light pulses to keep the average energy of the light output essentially steady (not flickering). The free-running pulse rate is planned to be, as an example, at least 4 times faster than the camera pulse rate to help blend out the interruption in timing. The pulse control 1500 may include free-running light pulses 1502 (e.g., 40 µs, etc.), camera trigger pulses 1503 (e.g., 200 µs, etc.), resulting light output 1501, a free-running pulse period 1504, a stop period 1505, a strobe period 1506, a lockout period 1508 (e.g., 5 divided by 10%, etc.), and a free-running return 1509.

Figure 18:
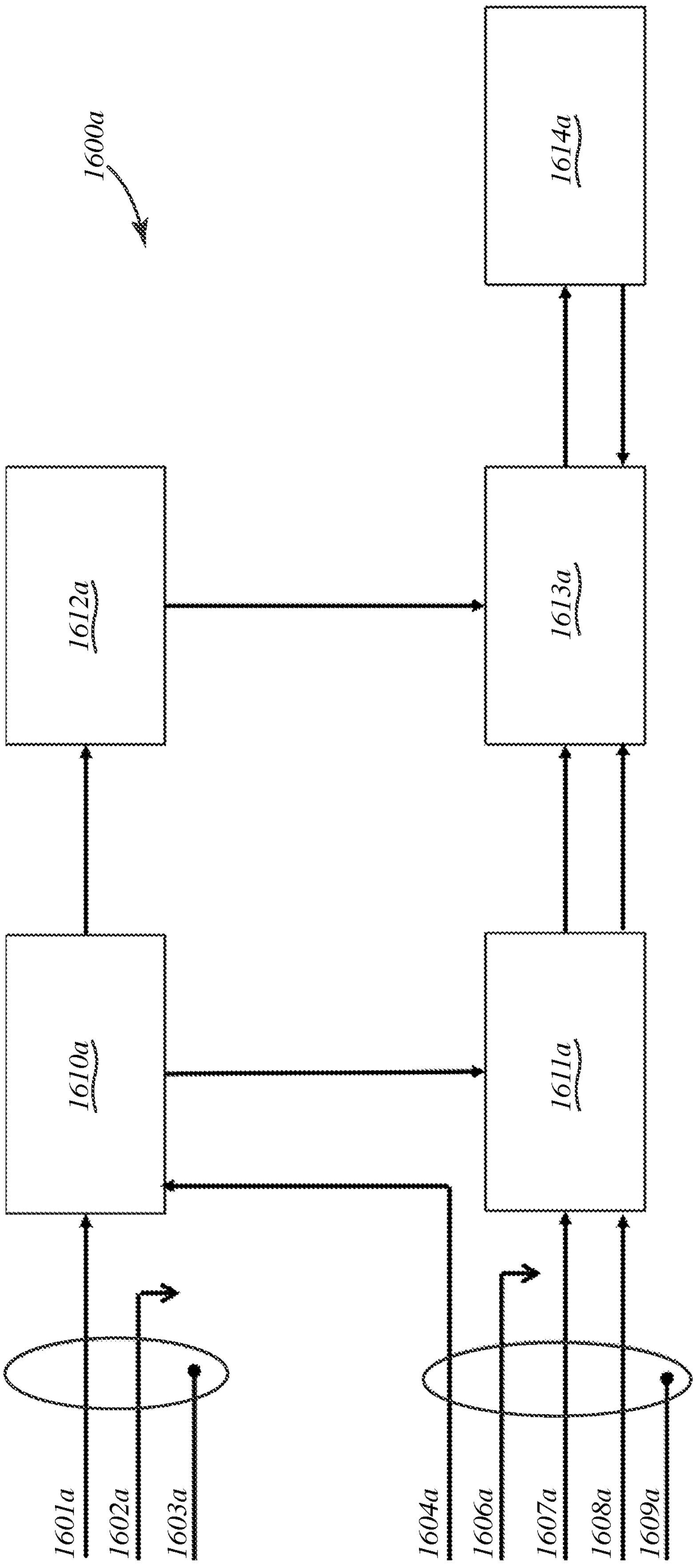
FIGS. 18, 19A, and 19B depict an example power management circuit for use with a machine vision system.
Figure 19A:
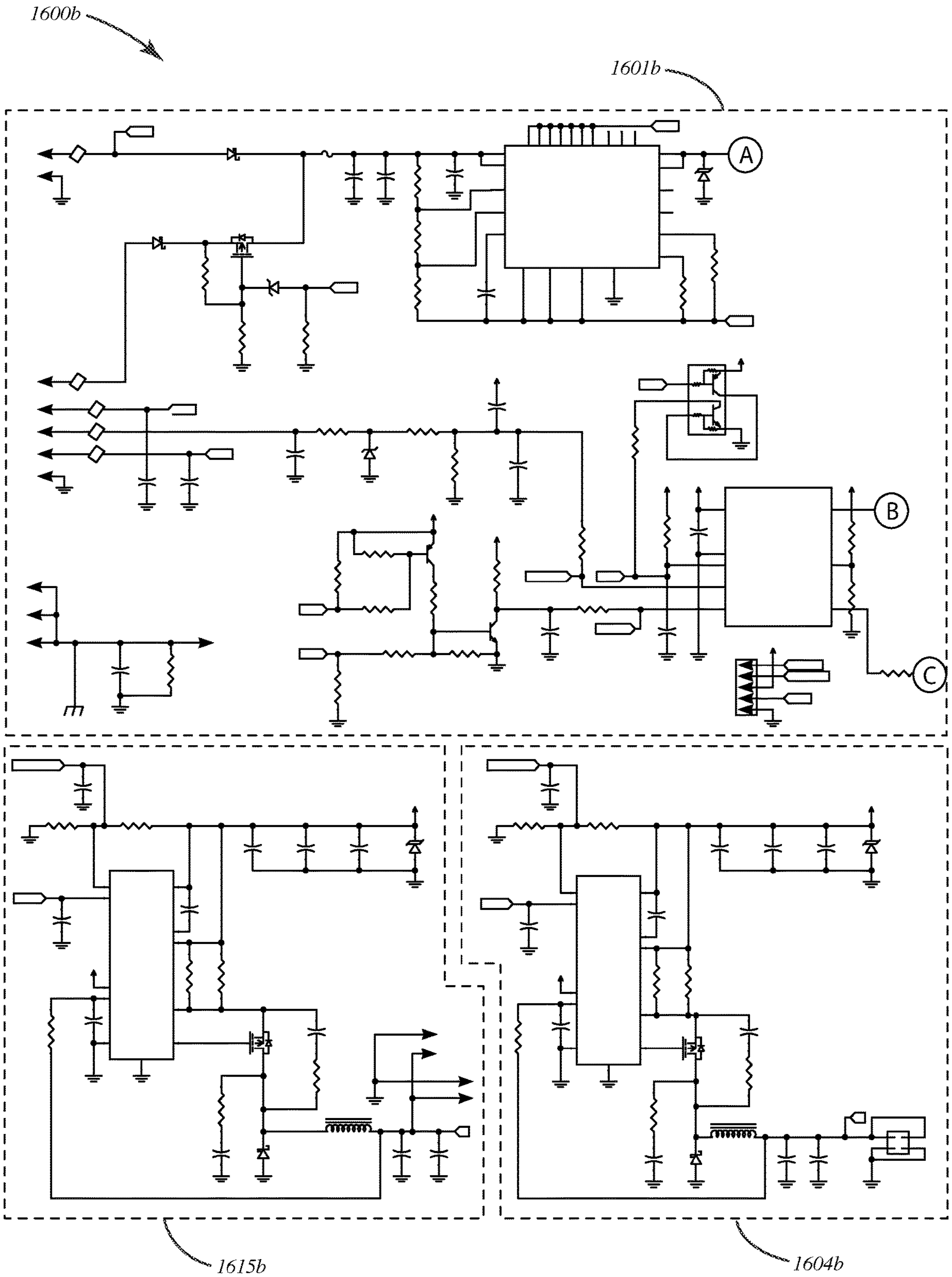
Figure 19B:
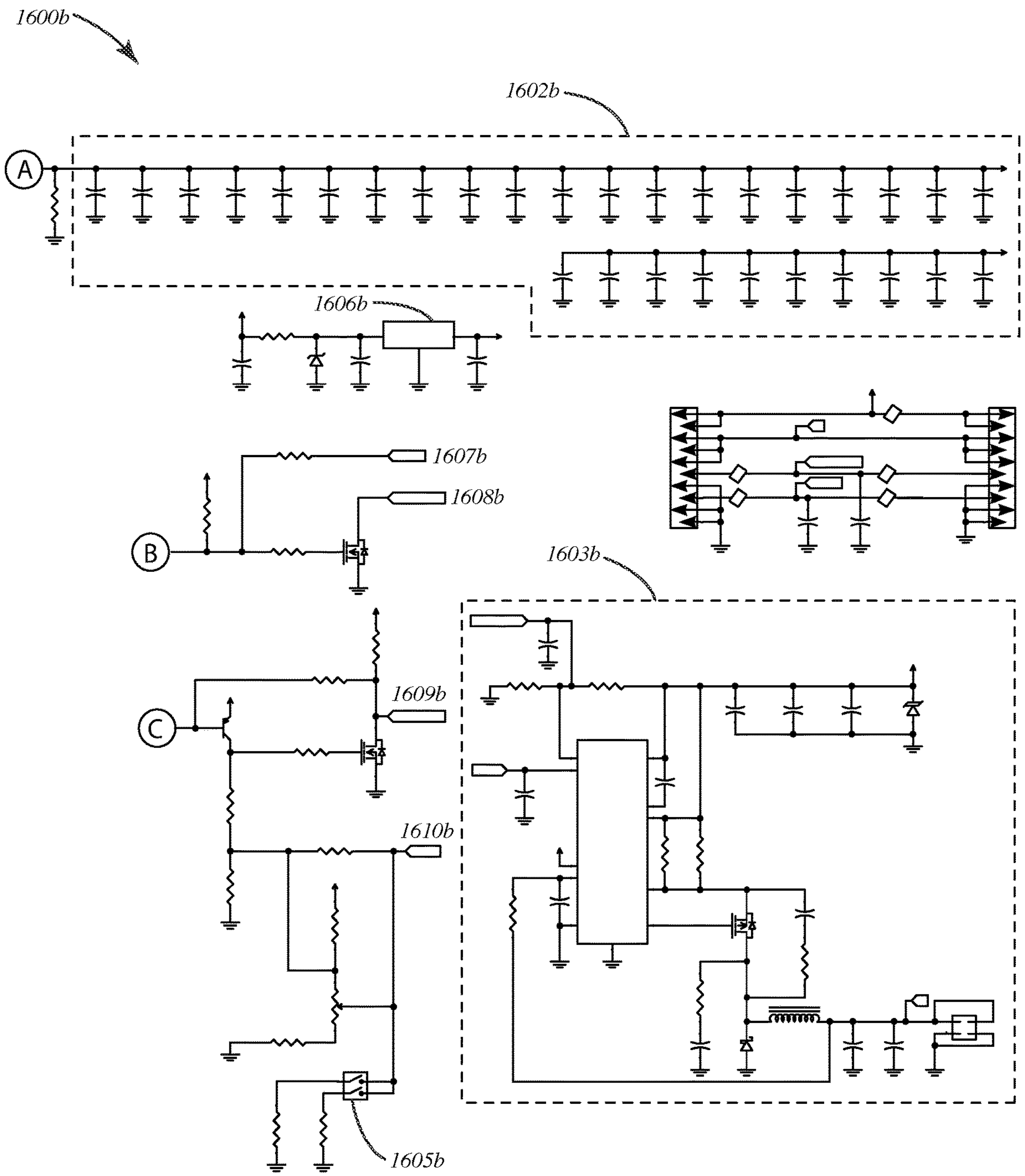
Figure 20:
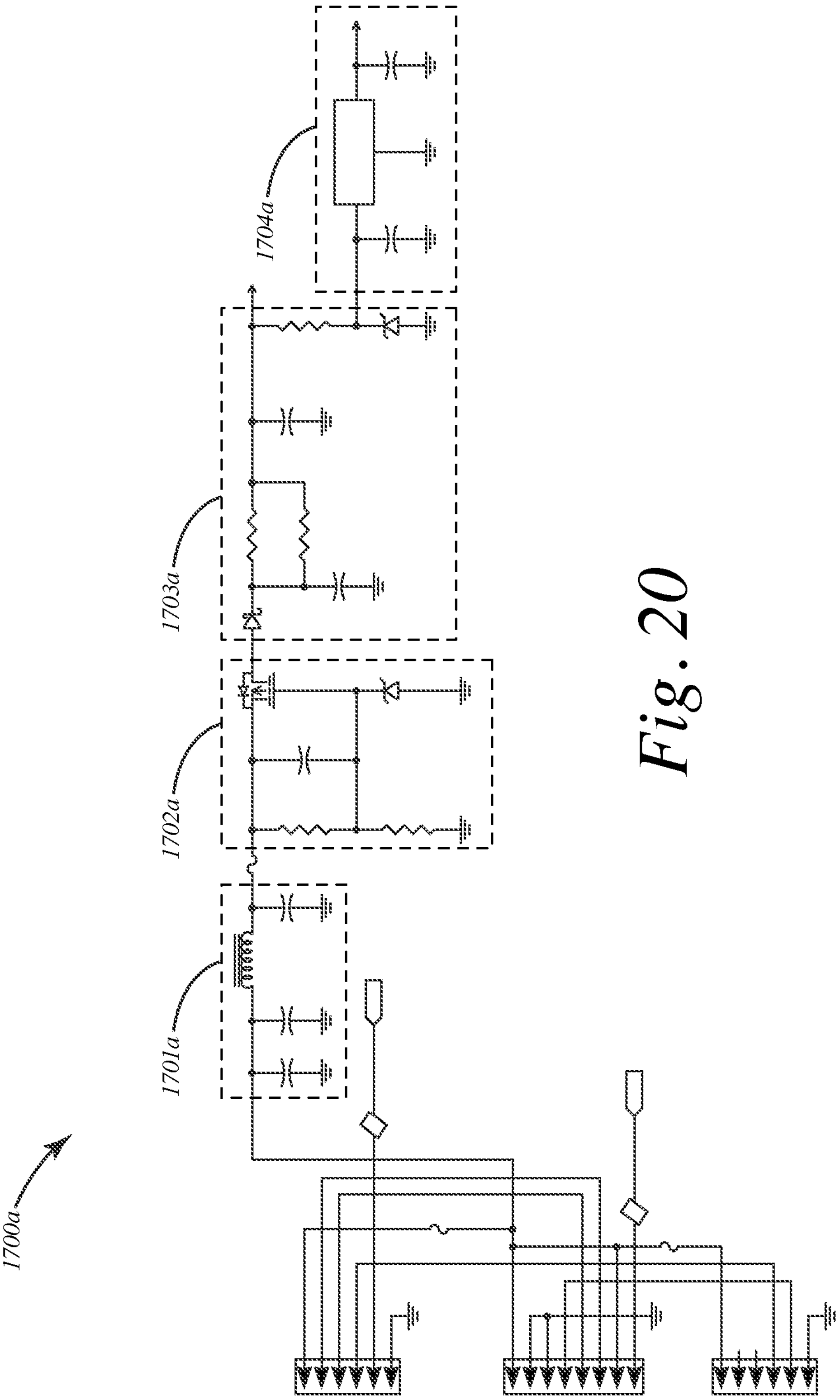
FIGS. 20-23 depict example power management circuits for use with a machine vision system.
Figure 21:
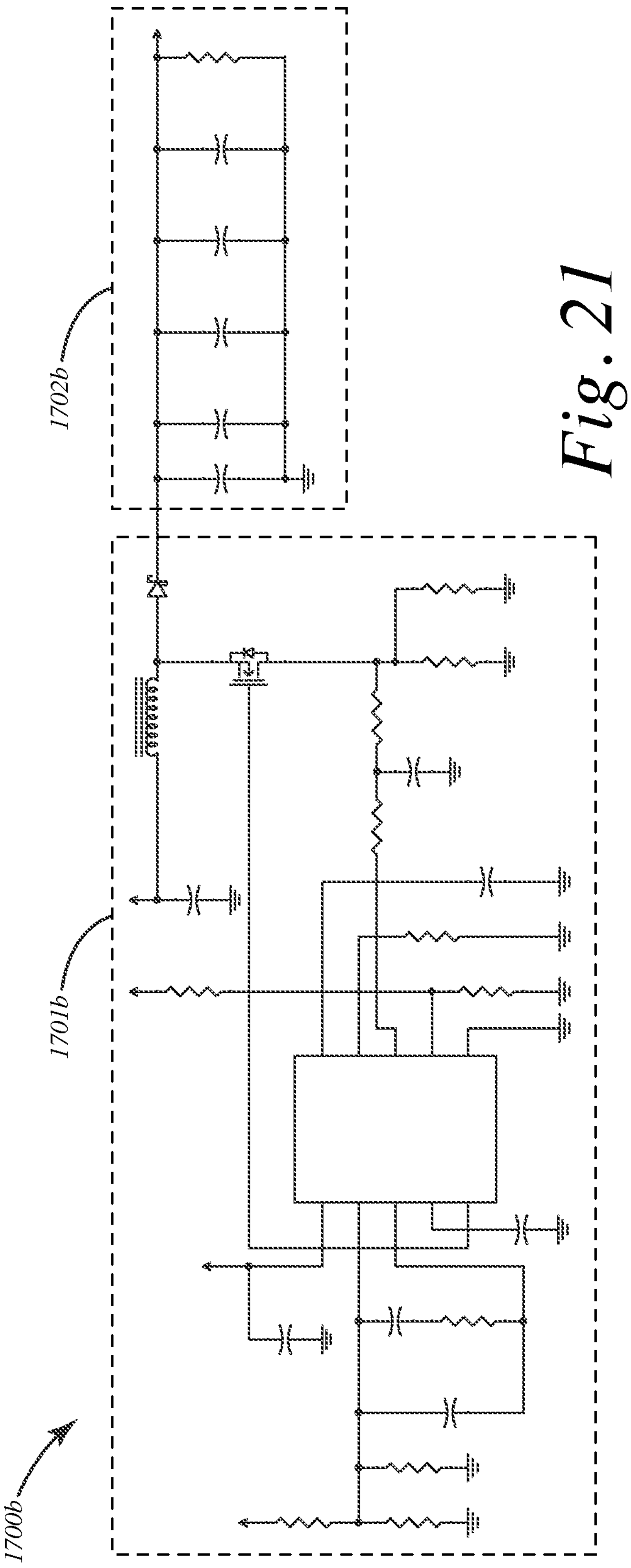
Figure 22:
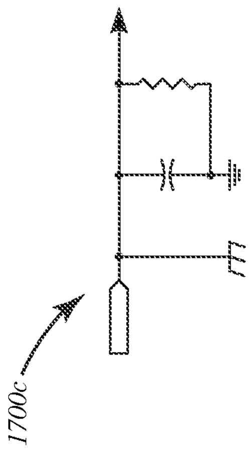
Figure 23:
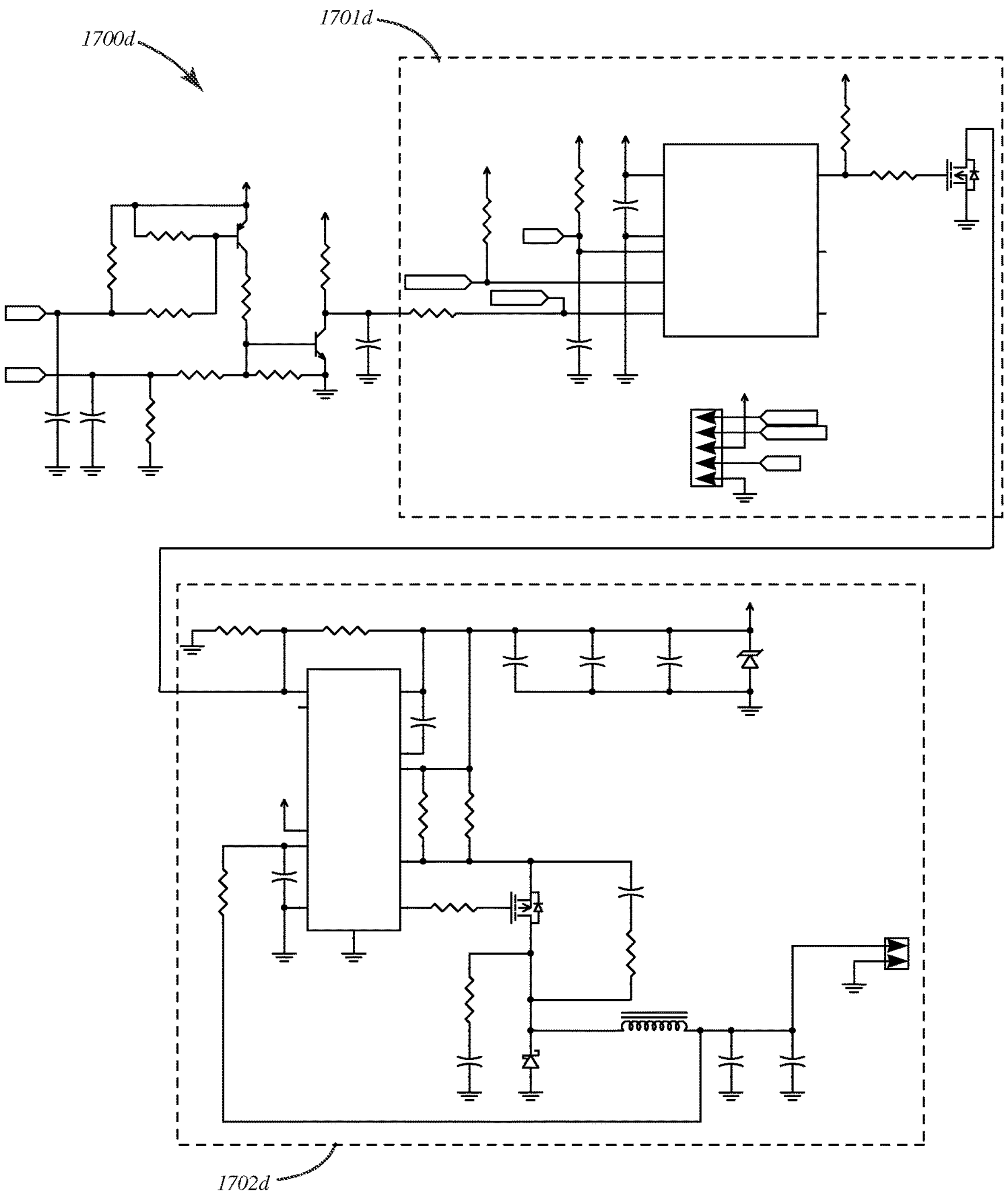

FIGS. 18, 19A, and 19B relate to energy management. The controller 1600*a* (e.g., Texas Instruments p/n TPS26400RHFR) performs multiple functions including regulation of a cold start current to charge capacitor bank 1612*a* (value set by resistors). The controller 1600*a* limits the peak current during/following light pulses (e.g., 2.3 A). These two features allow use of smart industrial ethernet switches that limit max average current to lights at, for example, 2 A maximum. The controller 1600*a* allows the use of power supplies certified as NEC Class 2, Limited Power Source (100 VA max allowed in this category). This level of safety lowers their overall installation cost in some applications. The controller 1600*a* or 1600*b* may limit an input current to, for example, 1A maximum or 2 A maximum with a 10% duty cycle.

The controller 1600*a* or 1600*b* may include a 24 Vdc positive connection 1601*a*, a 24 Vdc negative connection 1602*a*, a chassis ground 1603*a*, a 24 Vdc power input 1605*a*, a 24 Vdc return connection 1606*a*, a PNP strobe 1607*a*, a 0-10 Vdc dim input 1608*a*, a chassis ground 1609*a*, a power management controller 1610*a*, a micro controller 1611*a*, capacitor bank 1612*a*, LED current drives 1613*a*, LED arrays 1615*a*, an electronic fuse 1601*b* (e.g., a Texas Instruments P/N TPS 2640, etc.), a capacitor bank 1602*b*, a first LED drive 1603*b* (e.g., a LM3409 buck controller, etc.), a second LED drive 1604*b*, a pulse length DIP switch 1605*b*, a third LED drive circuit 1615*b*, a linear voltage regulator 1606*b*, a first LED drive output 1607*b*, a second LED drive output 1608*b*, a third LED drive output 1609*b*, and a fourth LED drive output 1610*b*.

FIGS. 20-23, another application of energy management technology 1400*a*, 1400*b*, 1400*c*, and 1400*d*, include a buck regulating LED drive topology used in higher voltage LED arrays (above 24V). The soft start circuit 1700*a* includes a low pass filter 1701*a*, a soft start circuit 1702*a*, a first output voltage 1703*a* (e.g., 24 Vdc, etc.), and a second output voltage 1704*a* (e.g., 5 Vdc, etc.). The voltage regulator 1700*b* may include a voltage regulator with current limit 1701*b* and an energy storage 1702*b* (e.g., a plurality of 1000 µF capacitors, etc.) The voltage regulator 1700*b* is configured to limit the peak charging current into the capacitor bank that feeds the buck regulating LED drive 1702*d*. The power management circuit 1700*a-d* may include an electrostatic discharge circuit 1700*c*. The LED drive circuit 1700*d* may include a pulse limit controller 1701*d* and a buck regulating LED drive 1702*d*. The diagram is similar except the power management controller is replaced with a voltage regulator.

This detailed description is to be construed as exemplary only and does not describe every possible invention, as describing every possible invention would be impractical, if not impossible. One may implement numerous alternate inventions, using either current technology or technology developed after the filing date of this application.

What is claimed is:

1. An illumination source, comprising:

a controller, which is configured to receive a specified pulse width and defined cycle time, wherein the controller generates free-running strobe output pulses based on the specified pulse width and the defined cycle time, wherein the controller also receives a free-running strobe output stop trigger and stops the free-running strobe output pulses based on the free-running strobe output stop trigger, wherein the controller also receives a camera strobe start trigger and starts a camera strobe output pulse based on the camera strobe start trigger, and wherein the controller also generates a camera image trigger based on the camera strobe start trigger, and a processor, wherein the processor measures a camera image trigger turn on pulse time, calculates a strobe lockout period based on a duty cycle of the free-running strobe output pulses, and implements that lockout period before the processor restarts the free-running strobe output pulses.

2. The illumination source of claim 1, further comprising:

an integrated LED driver, for driving an illumination source, wherein a restart trigger event follows the camera strobe start trigger, wherein the integrated driver then restarts the free-running strobe output pulses, having an average energy of light output which makes the camera strobe output pulse hidden in the free-running strobe output pulses.

* * * * *